United States Patent [19]

Kanbe et al.

[11] Patent Number: 4,781,441

[45] Date of Patent: Nov. 1, 1988

[54] METHOD OF CONTROLLING ORIENTATION OF LIQUID CRYSTAL, DEVICE USED THEREIN AND LIQUID CRYSTAL DEVICE PRODUCED THEREBY

[75] Inventors: Junichiro Kanbe; Kazuharu Katagiri, both of Yokohama; Shinjiro Okada, Kawasaki, all of Japan

[73] Assignee: Canon Kabushiki Kaisha, Tokyo

[21] Appl. No.: 671,916

[22] Filed: Nov. 15, 1984

[30] Foreign Application Priority Data

| Nov. 25, 1983 | [JP] | Japan | 58-222620 |
| Nov. 28, 1983 | [JP] | Japan | 58-223546 |
| Nov. 30, 1983 | [JP] | Japan | 58-226279 |
| Dec. 1, 1983  | [JP] | Japan | 58-227506 |

[51] Int. Cl.$^4$ .............................................. G02F 1/135
[52] U.S. Cl. ................................ 350/350 S; 350/336; 350/339 R; 350/344; 350/351
[58] Field of Search .............. 350/350 S, 339 R, 341, 350/344, 351, 331 T, 336

[56] References Cited

U.S. PATENT DOCUMENTS

| 3,964,158 | 6/1976  | Janning        | 350/341   |
| 4,219,255 | 8/1980  | Raynes         | 350/350 S |
| 4,240,712 | 12/1980 | Thirant        | 350/350 S |
| 4,390,245 | 6/1983  | Shimizu et al. | 350/344   |
| 4,561,726 | 12/1985 | Goodby et al.  | 350/339 R |

FOREIGN PATENT DOCUMENTS 0032362 1/1980 European Pat. Off. .......... 350/350 S 60115915 6/1985 Japan ........................ 350/350 S

OTHER PUBLICATIONS

Kondo et al., "A Practical Method of Preparing Thin Homogeneous Ferroelectric Smectic Cells," Japanese Journal of Applied Physics, vol. 22, No. 2, Feb. 1983, pp. L85-L87.

Clark, Lagerwall and Wahl, "Modulators, Linear Arrays, and Matrix Arrays using Ferroelectric Liquid Crystals," Proceedings of the SID, vol. 26, No. 2, 1985, pp. 133-139.

Ostrovskii et al., "Ferroelectric Properties of Smectic Liquid Crystals," JETP Letters, vol. 25, No. 2, 1977, pp. 70-72.

Primary Examiner—John K. Corbin
Assistant Examiner—Martin Lerner
Attorney, Agent, or Firm—Fitzpatrick, Cella, Harper & Scinto

[57] ABSTRACT

Orientation of a liquid crystal is controlled by first forming a phase boundary of the liquid crystal between a monoaxially anisotropic phase where the liquid crystal molecules are aligned in one direction and a higher temperature phase between a pair of base plates, transforming a part of the higher temperature phase adjacent to the phase boundary under cooling into the monoaxially anisotropic phase where liquid crystal molecules are aligned in parallel with the liquid crystal molecules in the already formed monoaxially anisotropic phase, and successively causing the phase transformation in the direction perpendicular to the phase boundary.

87 Claims, 23 Drawing Sheets

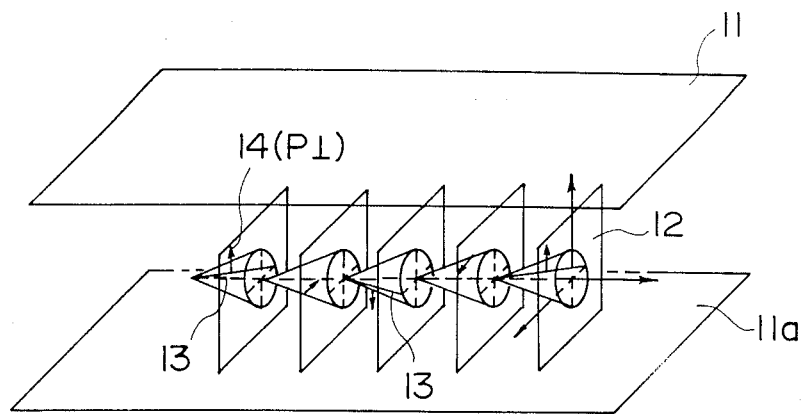
F I G. 1
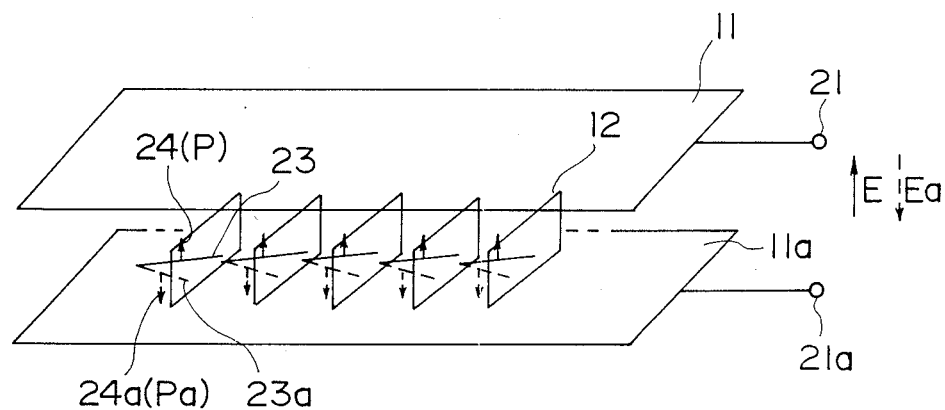
F I G. 2

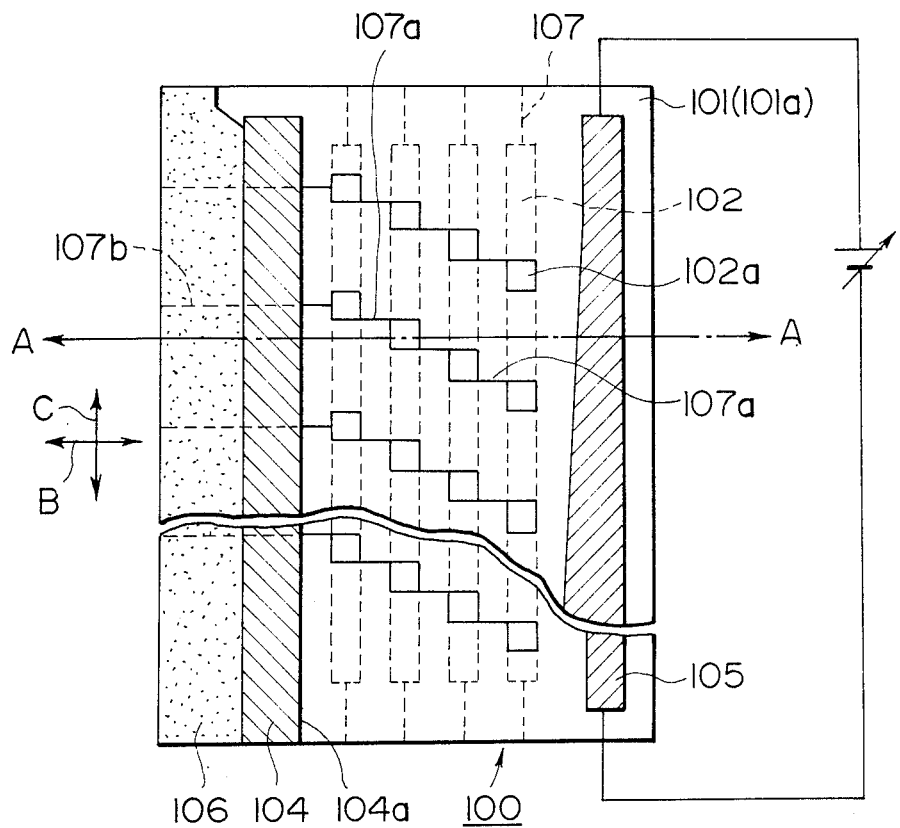
F I G. 3A

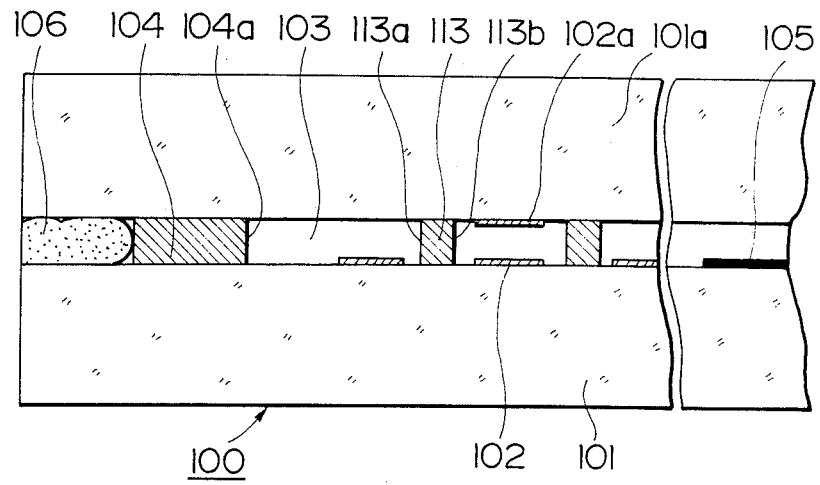
F I G. 9
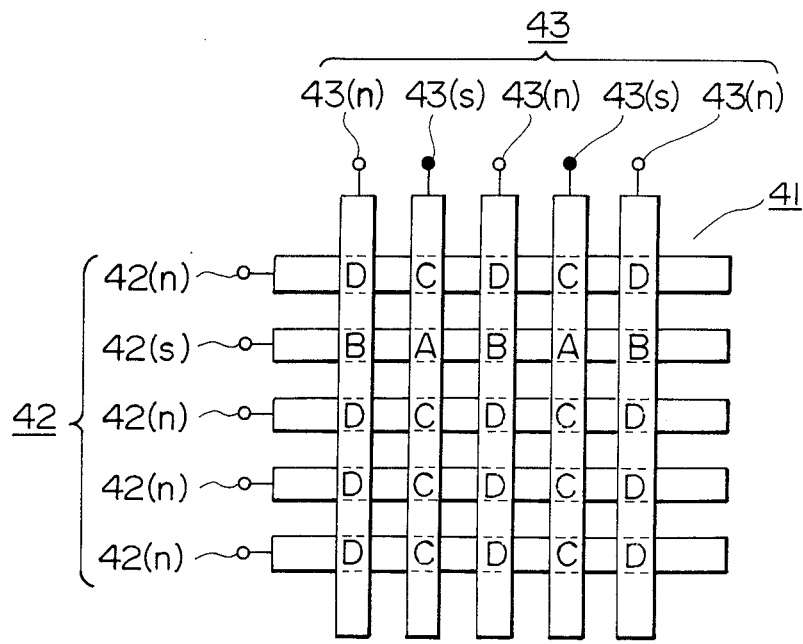
F I G. 10

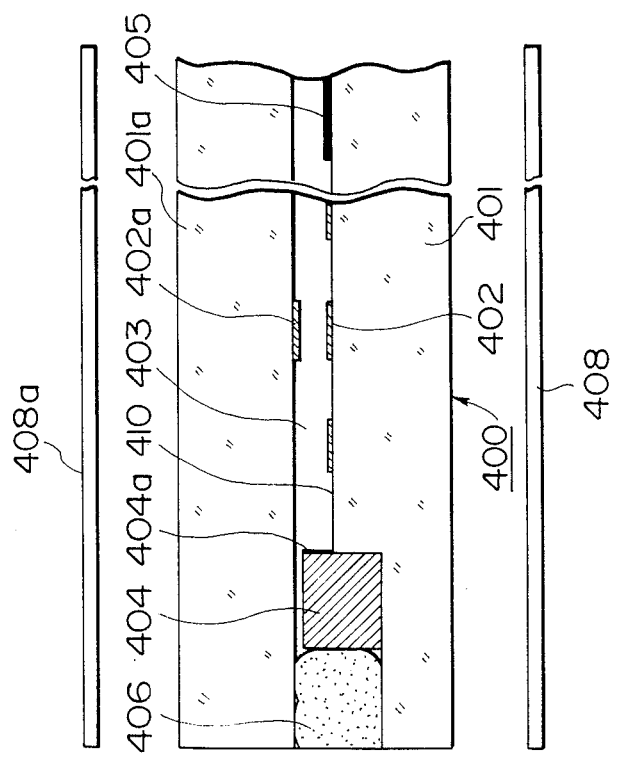
F I G. 13B

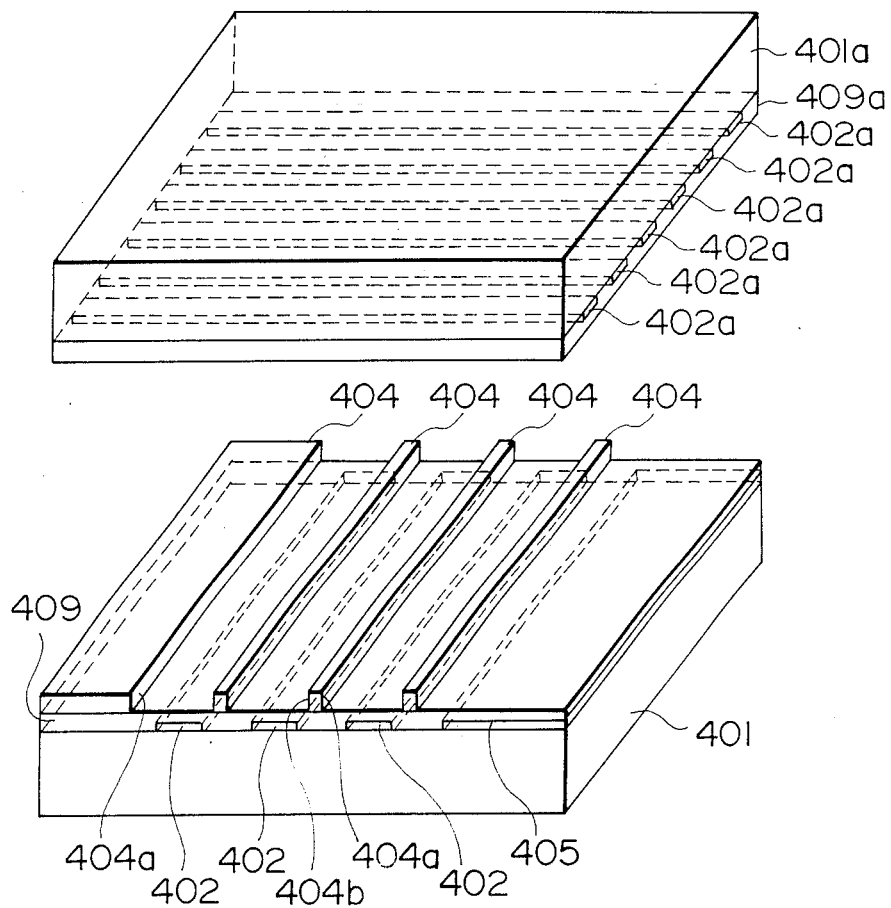
F I G. 14A

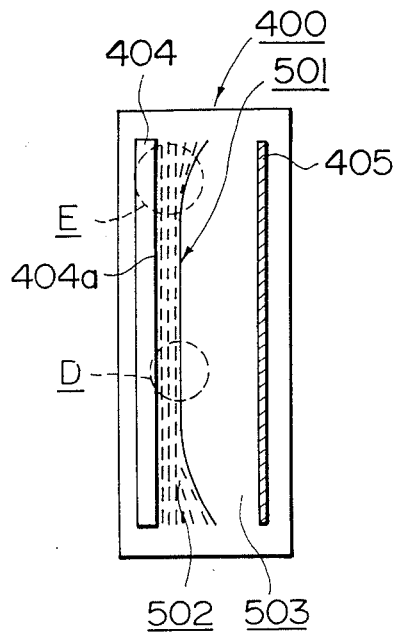
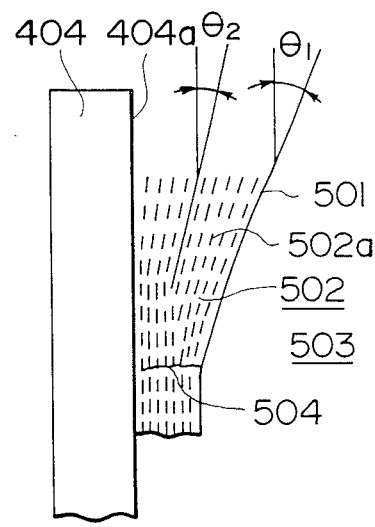
F I G. 15A
F I G. 15B
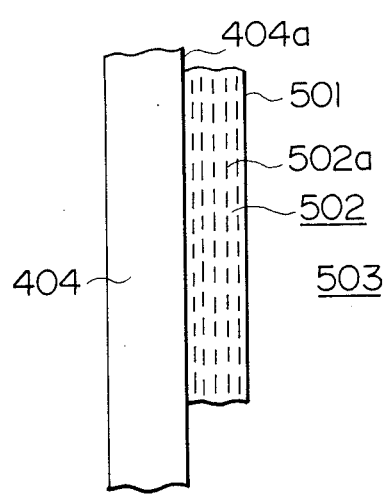
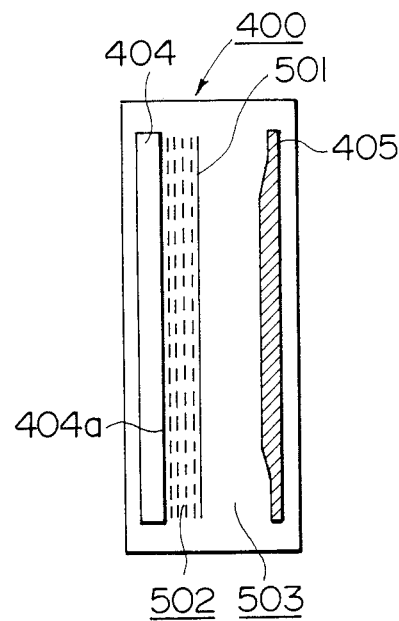
F I G. 15C
F I G. 15D

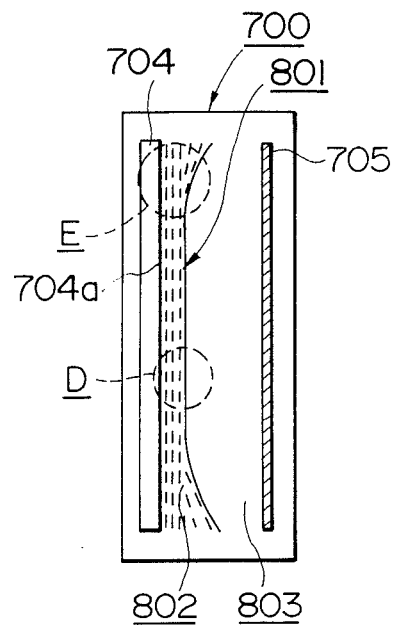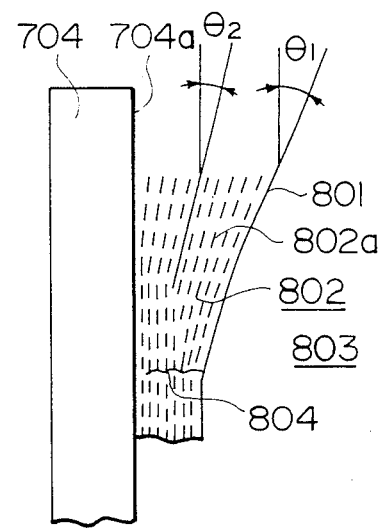
FIG. 21A  FIG. 21B
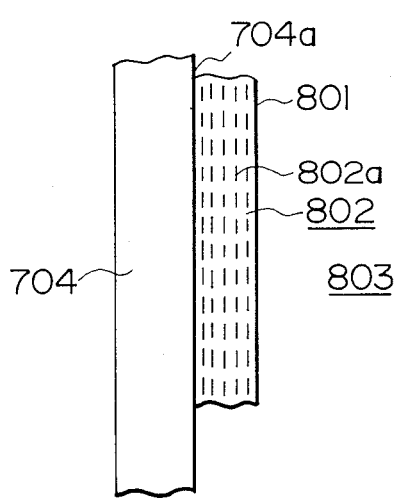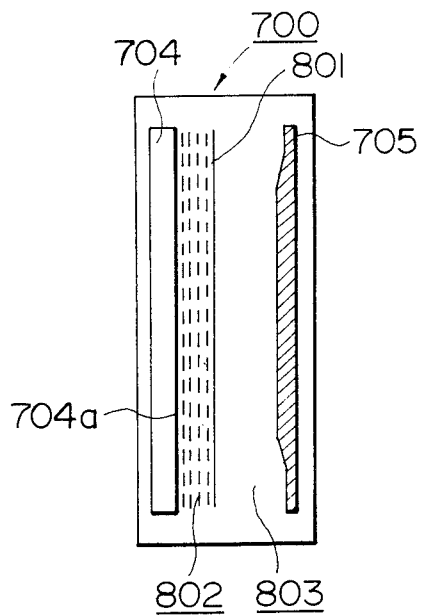
FIG. 21C  FIG. 21D

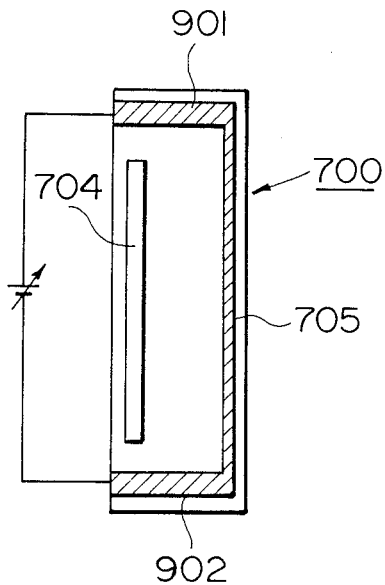
F I G. 22
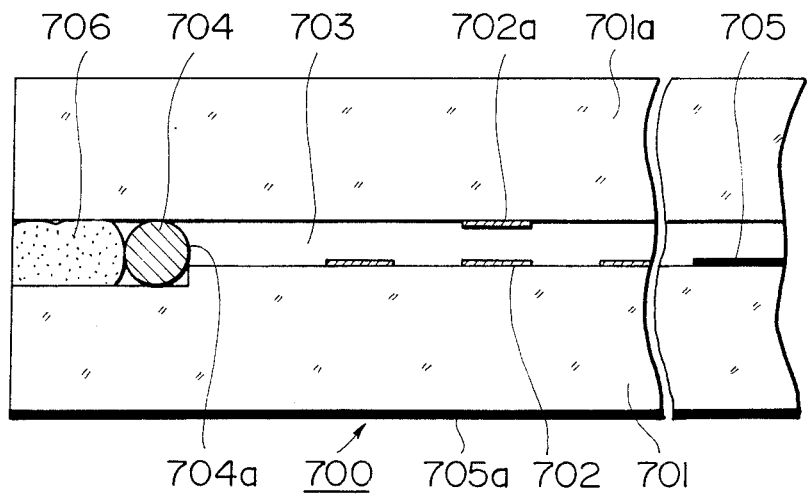
F I G. 23

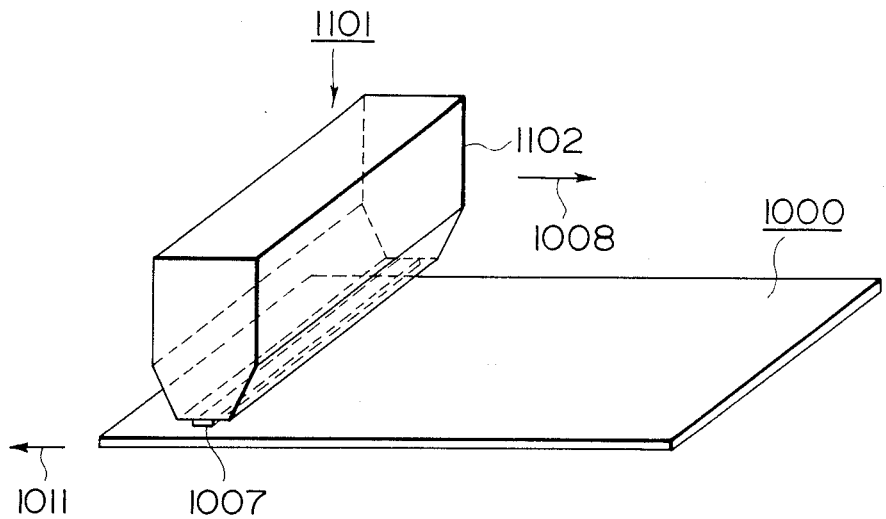
F I G. 28
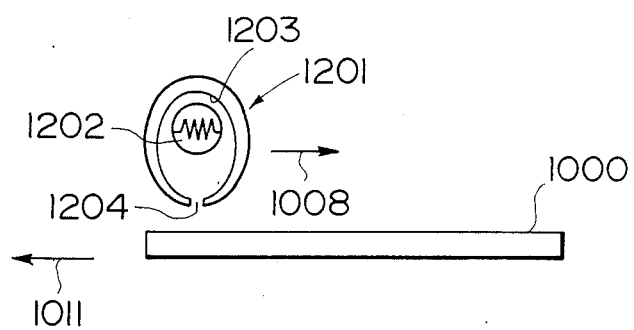
F I G. 29

METHOD OF CONTROLLING ORIENTATION OF LIQUID CRYSTAL, DEVICE USED THEREIN AND LIQUID CRYSTAL DEVICE PRODUCED THEREBY

BACKGROUND OF THE INVENTION

The present invention relates to a method of controlling the orientation of a smectic liquid crystal, particularly a chiral smectic liquid crystal, used in preparation of a liquid crystal device such as a liquid crystal display device and a liquid crystal optical shutter array and, more particularly, to a method of controlling the orientation of a liquid crystal for improving display and driving characteristics by the initial orientation or alignment of liquid crystal molecules, a device used in the method and a liquid crystal device prepared by the method.

Hitherto, liquid crystal display devices have been well known, which comprise a group of scanning electrodes and a group of signal electrodes arranged in matrix, and a liquid crystal compound filled between the two electrode groups to form a plurality of picture elements or pixels to display images or information at or near matrix intersecting points. For driving these display devices, there is employed a time-sharing driving method comprising selectively applying address signals sequentially and periodically to the group of scanning electrodes and selectively applying certain information signals to the group of signal electrodes in a parallel fashion in synchronism with the address signals. However, these display devices and the driving method therefor have serious drawbacks which will be described below.

Namely, it is difficult to obtain a high density of picture elements or large image area. Because of their relatively high response speed and low power dissipation, most liquid crystals which have been put into practice as display devices are TN (twisted nematic) type liquid crystals, as shown in "Voltage-Dependent Optical Activity of a Twisted Nematic Liquid Crystal" by M. Schadt and W. Helfrich, "Applied Physics Letters" Vol. 18, No. 4 (Feb. 15, 1971) pp. 127-128. In the liquid crystal of this type, molecules of nematic liquid crystal which show positive dielectric anisotropy under no application of an electric field form a structure twisted in the thickness direction of the liquid crystal layers (helical structure), and molecules of this liquid crystal form a structure aligned or oriented parallel to each other near the surfaces of both electrodes. On the other hand, the nematic liquid crystal which shows positive dielectric anisotropy under application of an electric field is oriented or aligned in the direction of the electric field, thus enabling optical modulation. When display devides are constructed in a matrix electrode arrangement using a liquid crystal of this type, a voltage higher than a threshold level required for aligning liquid crystal molecules in the direction perpendicular to electrode surfaces is applied to an area (a selected point) where a scanning electrode and a signal electrode are selected at a time, whereas a voltage is not applied to areas (non-selected points) where scanning electrodes and signal electrodes are not selected. Accordingly, the liquid crystal molecules are stably aligned parallel to the electrode surfaces. When linear polarizers having a cross-nicol relationship to each other (i.e. their polarizing axes are arranged perpendicular to each other) are arranged on upper and lower sides of the liquid crystal cell thus formed, light is not transmitted at selected points while it is transmitted at non-selected points. Thus, the liquid crystal cell can function as an image device.

However, when a matrix electrode arrangement is formed, a certain electric field is applied to regions where a scanning electrode is selected and signal electrodes are not selected or regions where a scanning electrode is not selected and a signal electrode is selected (which regions are so called "half-selected points"). If the difference between a voltage applied to the selected points and a voltage applied to half-selected points is sufficiently large, and a voltage threshold level required for allowing liquid crystal molecules to be aligned or oriented perpendicular to an electric field is set to a value therebetween, display devices normally operate. However, as the number (N) of scanning lines increases, a time (duty ratio) during which an effective electric field is applied to one selected point when a whole image area (corresponding to one frame) is scanned decreases with a ratio of 1/N. Accordingly, the larger the number of scanning lines, the smaller is the voltage difference as an effective value applied to a selected point and non-selected points when scanning is repeatedly effected. As a result, this leads to unavoidable drawbacks of lowering of image contrast or occurrence of interference or crosstalk. These phenomena are regarded as essentially unavoidable problems appearing when a liquid crystal having no bistability (i.e., liquid crystal molecules are horizontally oriented with respect to the electrode surface as the stable state and are vertically oriented with respect to the electrode surface only when an electric field is effectively applied) is driven (i.e., repeatedly scanned) by making use of a time storage effect. To overcome these drawbacks, the voltage averaging method, the two-frequency driving method, the multiple matrix method, etc. have been proposed. However, these methods are not sufficient to overcome the above-mentioned drawbacks. As a result, it is the present state that the development of large image area or high packaging density in respect to display elements has been delayed because it is difficult to sufficiently increase the number of scanning lines.

Meanwhile, turning to the field of a printer, as means for obtaining a hard copy in response to input electric signals, a Laser Beam Printer (LBP) providing electric image signals to electrophotographic photosensitive member in the form of light is most excellent in view of density of picture elements and printing speed.

However, the LBP has drawbacks as follows.

(1) The device becomes large in apparatus size.

(2) There is a high speed mechanically movable part such as a polygon scanner, resulting in noise and requiring strict mechanical precision, etc.

In order to eliminate drawbacks stated above, a liquid crystal shutter array as a device for changing electric signals to optical signals is proposed. When picture element signals are given with a liquid crystal shutter-array, for instance, more than 3000 signal generators are required for writing picture element signals into the length of 210 mm at a rate of 16 dots/mm. In order to independently feed signals to respective signal generators, wiring of lead lines for feeding electric signals to all of the respective signal generators is required, resulting in difficulties in production.

In view of the above, another attempt has been made to apply image signals corresponding to one line in a time-sharing manner with signal generators correspondingly divided into a plurality of rows. With this attempt, signal feeding electrodes can be common with a plurality of signal generator, thereby enabling a remarkable decrease in the amount of wiring required. However, if an attempt is made to increase the number (N) of rows using a liquid crystal showing no bistability as usually practiced, a signal "ON" time is substantially reduced to 1/N. This results in difficulties that the light quantity obtained on a photosensitive member is decreased, a crosstalk occurs, etc.

To overcome drawbacks with such conventional liquid crystal devices, the use of liquid crystal devices having bistability has been proposed by Clark and Lagerwall (e.g., Japanese Laid-Open Patent Appln. No. 56-107216, U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, in contrast to optical modulation devices in which the above-mentioned TN-type liquid crystals are used, the bistable liquid crystal molecules are oriented to first and second optically stable states with respect to one or the other electric field vectors, respectively. The characteristics of the liquid crystals of this type are such that they are oriented to either of two stable states at an extremely high speed and the states are maintained when an electric field is not supplied thereto. By making use of such properties, these liquid crystals having chiral smectic phase can essentially improve on a large number of problems with the prior art TN-type devices. This will be described in detail hereinafter in relation to the present invention.

However, in order that an optical modulation device in which a liquid crystal having bistability is used can realize desired driving characteristics, it is required that a liquid crystal disposed between a pair of parallel base plates has a molecule arrangement such that molecules can effectively be switched between the two stable states independent of the application of an electric field. For instance, in connection with ferroelectric liquid crystals having SmC*- or SmH*-phase, it is required that there is formed a region (monodomain) where liquid crystal layers having SmC*- or SmH*-phase are vertical to the surface of the base plates, i.e., the liquid crystal axis is aligned substantially in parallel therewith. However, with optical modulation devices in which a liquid crystal having bistability is used, the orientation of the liquid crystal having such a monodomain structure has not satisfactorily been formed, thus failing to obtain sufficient display characteristics.

For instance, in order to obtain such an orientation, there have been proposed a method of applying a magnetic field, a method of applying shearing stress, etc. However, these methods do not necessarily provide satisfactory results. For instance, the method of applying a magnetic field has drawbacks in that it requires a large scale apparatus and is not comparable with a thin layer cell having excellent operational characteristics. Further, the method of applying a shearing stress has a drawback in that it is not compatible with a method of filling a liquid crystal after a cell is prepared.

Meanwhile, in the liquid crystal device in which the above-mentioned TN-type liquid crystal is used, in order to form a monodomain of liquid crystal molecules in parallel with the surface of a base plate, for instance, a method of rubbing the surface of the base plate with a cloth, etc., or a method of effecting oblique vapor deposition of SiO, etc. has been used. In accordance with the rubbing method, liquid crystal molecules assume a low energy (i.e., stable) state where they align preferentially along the rubbing direction. Thus, a certain effect for preferentially orienting liquid crystals in one direction is given to such a rubbed surface. A structure having a face to which such wall effect is given is shown in, e.g. Canadian patent No. 1010136, etc. by W. Helfrich and M. Schdat. In addition to the rubbing method for giving the orientation effect, another method is employed, in which a structure having a face formed by oblique or tilt vapor deposition of SiO or $SiO_2$ on a base plate is used, and the face having a uniaxial anisotropy of SiO or $SiO_2$ has an effect for preferentially orienting liquid crystal molecules in one direction.

As stated above, the alignment or orientation control method, e.g., the rubbing method, or the oblique deposition method is one of the preferable methods for producing liquid crystal devices. However, if the orientation control is implemented to liquid crystals having bistability with these methods, a face having a wall effect for preferentially aligning a liquid crystal only in one direction is formed, thereby to deteriorating the desirable characteristics of the bistable liquid crystals such as bistability with respect to an electric field applied thereto, high responsiveness or monodomain forming ability.

SUMMARY OF THE INVENTION

With the above circumstances in view, a primary object of the present invention is to provide a method of controlling the orientation of a liquid crystal applicable to such optical modulation devices comprising liquid crystal having such characteristics as bistability, potential suitability for display devices having high speed responsiveness, high density of picture elements and large image area, or optical shutters having a high shutter speed etc., and capable of sufficiently realizing their characteristics by improving monodomain forming ability or initial orientation which has been a problem in the prior art.

We have made further research with the above mentioned object, particularly paying attention to the orientation characteristics of a liquid crystal material in a temperature decreasing stage where the liquid crystal material is transformed from a different phase (a high temperature state such as an isotropic phase) into a monoaxially anisotropic phase (a low temperature state such as an SmA (smectic A) phase). As a result, we have found that, during the phase transition from the different phase (high temperature phase) into the monoaxially anisotropic phase, the molecular axis of a monoaxially anisotropic phase newly formed through the phase transition at the spacial boundary between the different phase region and the monoaxially anisotropic phase is oriented parallel to the orientation direction of the liquid crystal molecules in the already formed monoaxially anisotropic phase and that the monodomain of the monoaxially anisotropic phase grows remarkably stably when the direction of growth of the monoaxially anisotropic phase region is kept perpendicular to the orientation direction of the liquid crystal molecules We have further found that, by disposing a structural member having a side wall with a horizontally or homogeneously orienting characteristic as a nucleus generating member (i.e., a member for promoting the generation of liquid crystal nuclei in the monoaxially anisotropic phase), it is possible to form an original nucleus of monoaxially anisotropic phase as one forming a monodomain where liquid crystal molecules are aligned or oriented parallel to the nucleus generating member, whereby a liquid crystal device is provided wherein an operational performance and a monodomain characteristic of liquid crystal are compatible with each other.

The method of controlling orientation of a liquid crystal is based on the above knowledge and comprises: forming between a pair of base plates a phase boundary of a liquid crystal between a monoaxially anisotropic phase of the liquid crystal where liquid crystal molecules are aligned in one direction and a different phase of the liquid crystal which is a higher temperature phase than the monoaxially anisotropic phase, transforming a part of the different phase adjacent to the phase boundary under temperature decrease into the monoaxially anisotropic phase where liquid crystal molecules are aligned in parallel with the alignment direction of the liquid crystal molecules in the aforesaid monoaxially anisotropic phase, and succeessively causing the phase transformation from the phase boundary in a direction perpendicular to the phase boundary, thereby to form a monodomain of the liquid crystal wherein the liquid crystal molecules are aligned in one direction.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a perspective view illustrating a liquid crystal cell used in the invention.

FIG. 2 is a perspective view illustrating the operational principle of the liquid crystal device shown in FIG. 1.

FIG. 3A is a plan view of a liquid crystal device used in the present invention.

FIGS. 6, 7, 8 and 9 are sectional views respectively showing a preferred embodiment of the liquid crystal cell of the present invention.

FIG. 10 is a plan view schematically showing an electrode arrangement of an optical modulation device of the present invention.

FIG. 13B is a sectional view taken along the line A—A.

FIGS. 15A to 15C are plan views illustrating growth stages of liquid crystal. FIG. 15D is a plan view showing another embodiment of the liquid crystal cell used in the present invention.

FIGS. 21A to 21C are plan views illustrating growth stages of liquid crystal. FIG. 21D is a plan view showing another embodiment of the liquid crystal cell used in the present invention. FIG. 22 is a plan view showing a still further embodiment of the liquid crystal cell used in the present invention.

FIGS. 23, 24, 25 and 26 are sectional views respectively showing a preferred embodiment of the liquid crystal cell of the present invention.

FIG. 28 is a perspective view illustrating another embodiment of the method of the present invention.

FIG. 29 is a sectional view schematically illustrating another embodiment of the method of the present invention.

DESCRIPTION OF THE PREFERRED EMBODIMENTS

Figure 3B:
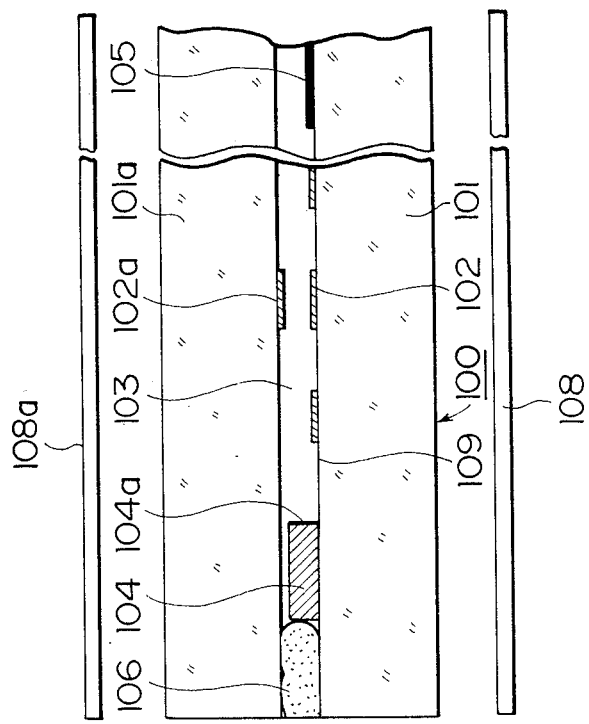
FIG. 3B is a sectional view taken along the line A—A of FIG. 3A.

A liquid crystal material especially adapted to the present invention is a ferroelectric liquid crystal having bistability. More specifically, liquid crystals having chiral smectic C phase (SmC*) or H phase (SmH*) is preferably used.

Ferroelectric liquid crystals are described in, e.g., "LE JOURNAL DE PHYSIQUE LETTERS" 36 (L-69) 1975, "Ferroelectric Liquid Crystals"; "Applied Physics Letters" 36 (11) 1980, "Submicro Second Bistable Electrooptic Switching in Liquid Crystals"; "Applied Physics" 16 (141) 1981, "Liquid Crystals", etc. In the present invention, ferroelectric liquid crystals disclosed in these publication may be used.

Examples of ferroelectric liquid crystal compounds include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butyl-resorcylidene-4'-octylaniline (MBRA 8), etc.

When a liquid crystal device is constituted of these materials, for the purpose of maintaining a temperature so that the liquid crystal compound assumes SmC*- or SmH*-phase, the device may be supported, if necessary, by a block of copper in which a heater is embedded, or a suitable supporting member.

Furthermore, in the present invention, chiral smectic F phase (SmF*), I phase (SmI*), G phase (SmG*), K phase (SmK*) and J phase (SmJ*) are also applicable in addition to the above mentioned SmC* and SmH* phases.

FIG. 1 is a view schematically illustrating an example of a liquid crystal cell for the purpose of explaining the operation of a ferroelectric liquid crystal. Reference numerals 11 and 11a denote base plates (glass plates) coated with transparent electrodes comprising thin films of $In_2O_3$, $SnO_2$, ITO (Indium-Tin Oxide), etc. A liquid crystal having typically SmC*-or SmH*-phase in which liquid crystal layers 12 are oriented vertically to the surfaces of the base plates is hermetically disposed between base plates 11 and 11a. Full lines 13 denote liquid crystal molecules, respectively. These liquid crystal molecules 13 have dipole moments ($P_\perp$) 14 perpendicular to the molecules. When a voltage higher than a certain threshold is applied between electrodes on the base plates 11 and 11a, the helical structures of liquid crystal molecules 13 are loosened or unwound. Thus, the orientation directions of the liquid crystal molecules 13 can be changed so that dipole moments ($P_\perp$) 14 are all directed to the applied electric field. Liquid crystal molecules 13 have elongated shapes, and show refractive index anisotropy between the long and short axes. Accordingly, it is easily understood that, for instance, when polarizers having a cross nicol relationship to each other, (i.e., their polarizing axes are crossing or perpendicular to each other) are arranged on the upper and lower sides of glass surfaces, a liquid crystal modulation device of which optical characteristics change depending upon the polarity of an applied voltage can be realized.

The thickness of a liquid crystal cell preferably used in he optical modulation device according to the present invention can be made sufficiently thin (e.g., less than $10\mu$). As the thickness of the liquid crystal layers becomes thin, the helical structures of liquid crystal molecules are loosened or unwound even under no application of an electric field as shown in FIG. 2, whereby the liquid crystal molecules are caused to have either P in the upper direction (24) or Pa in the lower direction (24a). When electric fields E and Ea having polarities different from each other and higher than a certain threshold level are applied to the cell thus formed with voltage applying means 21 and 21a, the dipole moments change in the upper (24) or lower (24a) direction, depending upon the electric field vector of electric field E or Ea, respectively. In accordance with the changes, the liquid crystal molecules are oriented to either the first stable state 23 or the second stable state 23a.

As previously mentioned, the application of such ferroelectric liquid crystal to an optical modulation device can provide two major advantages. First is that the response speed is quite fast. Second is that liquid crystal molecules show bistability with respect to their orientation. The second advantage will be further explained, e.g., with reference to FIG. 2. When the electric field E is applied, the liquid crystal molecules are oriented to the first stable state 23. This state is stably maintained even if the applied electric field is removed. On the other hand, when the opposite electric field Ea is applied, they are oriented to the second stable state 23a to change their directions. Likewise, this state is stably maintained even if the applied electric field is removed. Further, as long as the given electric field E is not above a certain threshold level, they are maintained at respective oriented states. For effectively realizing such high response speed and bistability, it is preferred that the thickness of the cell is as thin as possible.

The most serious problem when a device is formed with a ferroelectric liquid crystal is that it is difficult to form a cell having a uniform monodomain of liquid crystal in which layers having SmC*- or SmH*-phase are arranged in a direction perpendicular to the base plate surfaces and liquid crystal molecules are arranged substantially parallel to the base plate surfaces, as previously mentioned. A primary subject of the invention is to solve this difficulty.

FIG. 3A shows a partial plan view of an example of a liquid crystal device obtained through the method of controlling the orientation of a liquid crystal according to the present invention. FIG. 3B is a sectional view taken along the line A—A in FIG. 3A. In any of these figures, accurate reduction in scale is not adopted for easier understanding of the cell structure. In the figures, a structural example of a cell for giving a shutter array for a printer is shown. A cell 100 shown in FIGS. 3A and 3B comprises a pair of base plates 101 and 101a made of glass or plastic plates and held by a spacer (not shown) to leave a predetermined gap. These base plates are bonded to each other with an adhesive 106 to give a cell structure. On base plate 101 are disposed a plurality of transparent electrodes 102 forming a group of electrodes (for example, a scanning voltage applying electrode group of a matrix electrode arrangement) which are formed in a predetermined pattern such as a stripe pattern. On base plate 101a are formed a plurality of transparent electrodes 102a intersecting with the above mentioned transparent electrodes 102 and forming another group of electrodes (for example, a signal voltage applying electrode group of a matrix electrode arrangement) which are formed in segments disposed in a staggered fashion and connected with leads 107a. Transparent electrodes 102 and 102a are connected to leads 107 and leads 107b, respectively. Signals from an external circuit are respectively applied to the terminals of respective leads 107 and 107b.

On base plates 101 and 101a there may be formed an insulating film (not shown) of silicon monoxide, silicon dioxide, aluminum oxide, zirconia, magnesium fluoride, cerium oxide, cerium fluoride, silicon nitride, silicon carbide, boron nitride, polyvinyl alcohol, polyimide, polyamide imide, polyester imide, polyparaxylylene, polyester, polycarbonate, polyvinyl acetal, polyvinyl chloride, polyamide, polystyrene, cellulose resin, melamine resin, urea resin, acrylic resin, or the like. Such an insulating film may also add an advantage of preventing generation of undesirable current due to a minor quantity of impurities contained in the liquid crystal layer 103, whereby liquid crystal compounds are not deteriorated even after repeated operations.

The cell structure shown in this specific example comprises the above mentioned layer of liquid crystal 103 showing ferroelectricity in a specific temperature range, a nucleus generating member 104 and a heat generating member 105 such as a heater.

Nucleus generating member 104 is formed in a stripe by first forming a film of a resin such as polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, cellulose resin, melamine resin, urea resin or acrylic resin or an inorganic compound such as SiO, $SiO_2$ or $TiO_2$, and subjecting the film to an ordinary photolithographic process. Nucleus generating member 104 may be formed of the same material as base plate 101 or 101a.

Heat generating member 105 may suitably be a film resistor such as that of indium oxide, tin oxide or ITO (indium tin oxide), for example.

When liquid crystal cell 100 is sandwiched between polarizers 108 and 108a which are disposed on both sides of base plates 101 and 101a in a cross nicol or parallel nicol arrangement and voltages are applied between electrodes 102 and 102a, an optical modulation function is attained.

A more specific example of liquid crystal cell 100 shown in FIGS. 3A and 3B is explained. In a preferred example, transparent electrodes 102 form a group of scanning electrodes in the form of stripes each having a width of 62.5 μm, while transparent electrodes 102a provide a group of signal electrodes each forming a picture element measuring 62.5 μm×62.5 μm. Heat generating member 105 comprises an ITO film of 0.6 mm in average width and 1000 Å in thickness, while the thickness of liquid crystal layer 103 is preferably kept at about 2 μm.

Liquid crystal cell 100 is contained in a heating case (not shown) and interposed between a pair of polarizers 108 and 108a arranged to have polarizing directions crossing at right angles. This combination may be used as a liquid crystal shutter array for an electrophotographic printer. In this case, arrow B in FIG. 3A corresponds to the rotational direction of a photosensitive drum for the electrophotography.

In a specific example, nucleus generating member 104 was formed as follows. First, a polyimide forming solution ("PIQ" mfd. by Hitachi Kasei Kogyo K.K., nonvolatile matter content of 14.5 wt.%) is coated on a base plate 101 in 10 sec. with a spinner coater rotating at 3000 rpm and thereafter heated at a temperature of 120° C. for 30 min. to form a coating film having a thickness of 2 μm. Then a positive type resist solution ("AZ 1350" mfd. by Shipley Company, Ltd.) is spinnercoated onto the coating film and prebaked. The resist layer is exposed to light through a stripe-shaped mask having a masking width of 0.5 mm. Then, by developing the resist with a developer "MF 312" containing tetramethylammonium hydroxide, the resist film at the exposed portion and the polyimide film located therebelow are etched to form through holes. After the base plate thus treated is washed with water and dried, the resist film at the non-exposed portion is removed with methyl ethyl ketone. Thereafter, the polyimide film is cured by heating at 200° C for 60 min. and 350° C for 30 min. to form a nucleus generating member of a polyimide (PIQ).

Next, a method of controlling the orientation of liquid crystal layer 103 is more specifically explained with reference to FIG. 3 and an example wherein a liquid crystal material DOBAMBC showing ferroelectricity at specific temperatures is used.

A liquid crystal cell 100 hermetically containing DOBAMBC is set in a heating case (not shown) so that the entire cell can be heated. Then, the temperature of the heating case is controlled so that the average temperature of the cell will be, e.g., 90° C. At this time, DOBAMBC assumes a liquid crystal phase of SmC* or SmA. Then, an electric current is passed through a heater 105 and gradually increased, whereby a portion of the liquid crystal in close vicinity to heater 105 exceeds the transformation temperature from SmA to isotropic phase of about 118° C. and is transformed into the isotropic phase, i.e., a liquid state. On further increase in electric current, the isotropic region gradually extends while maintaining its boundary substantially in parallel with heating member 105 until the entirety of liquid crystal layer 103 assumes the isotropic phase.

In this state, the temperature in the longitudinal direction (C direction in FIG. 3A) of the liquid crystal state is uniform, and there is formed a temperature gradient in the transverse direction (B direction in FIG. 3B) such that the temperature gradually increases from the nucleus generating member 104 to the heating member 105. For example, such a temperature gradient is formed that the temperature in the vicinity of side wall 104a of nucleus generating member 104 is about 120° C. and the temperature in the vicinity of heating member 105 apart therefrom by about 1.5 mm is about 140° C.

Then, from the condition where the above temperature gradient has been imparted to cell 100, the temperature of the case in which cell 100 is set is gradually decreased from 90° C. at a rate of, e.g., 10° C./h, whereby the temperature in the vicinity of side wall 104a of nucleus generating member 104 first becomes lower than the transformation temperature from isotropic to SmA of about 116° C., and a nucleus of SmA phase is formed in this region (FIG. 3B). In this case, because both side wall 104a of nucleus generating member and face 109 of base plate 101 have the function of horizontally orienting the liquid crystal molecules, when the SmA phase is formed in the vicinity of side wall 104a, such a regulating force is applied to the liquid crystal molecular axes that the axes will align parallel to both face 109 of base plate 101 and the longitudinal direction of side wall 104a, whereby the resultant nucleus of SmA forms a monodomain oriented horizontally with respect to side wall 104a and face 109 of base plate 101. On further decrease in temperature of the case, a portion of the isotropic phase in the vicinity of the phase boundary between the already formed SmA phase and the isotropic phase causes a transformation into an SmA phase having an alignment or orientation direction in parallel with that of the already formed SmA phase. As a result, on continuing the temperature decrease with a temperature gradient, the monodomain region of SmA phase continuously spreads. Herein, it is preferred that the growing or spreading speed of the phase boundary between the monodomain region and the isotropic phase region is uniform along the longitudinal direction of liquid crystal cell 100 (C direction in FIG. 3A). When the case is cooled to a temperature on the order of, e.g., 70° C., substantially the entire region of the liquid crystal except for the close vicinity of heating member 105 is transformed into SmA phase.

Then, the electric current applied to the heating member is gradually decreased to remove the temperature gradient, whereby the temperature of the entire liquid crystal cell 100 is uniformly 70° C. and the liquid crystal is transformed into SmC*. In this case, while liquid crystal molecules in the vicinity of heating member 105 can sometimes assume a random alignment, a uniform monodomain is maintained in the region where electrodes 102 and 102a are disposed.

It is important in the above mentioned orientation controlling method that the temperature is uniform in direction C while giving as large a temperature gradient as possible in direction B in FIG. 3A. This point will be explained by referring to FIGS. 4A to 4D.

Figure 4A:
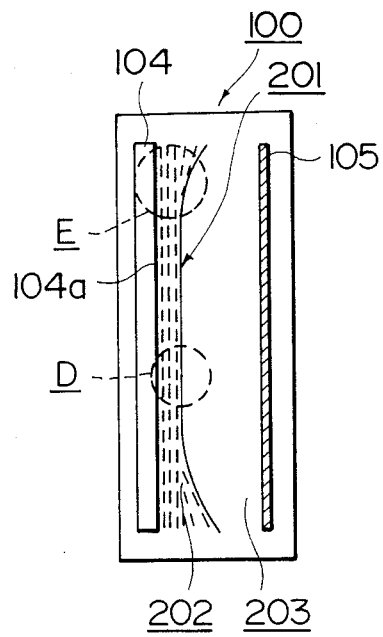
FIGS. 4A, 4B and 4C are plan views schematically illustrating growth stages of liquid crystal.

FIG. 4A is a plan view schematically illustrating the stage of growth of SmA phase during gradual temperature decrease for developing SmA phase in a cell wherein a heating member 105 is formed in a stripe form according to the above described method. In the figure, reference numeral 201 denotes a phase boundary between the SmA phase region and the isotropic phase region. When heating member 105 has a linear stripe shape having a uniform width as shown in the figure, the temperature in the cell is lower in an end region E than in mid-region D along the longitudinal direction of cell 100, unless there is a special contrivance in a case (not shown) housing the cell. Therefore, phase boundary 201 grows substantially parallel to side wall 104a of nucleus generating member 104 in the neighborhood of mid-region D, whereas it grows with an inclination in end region E as illustrated. The appearances of liquid crystal molecule alignments in end region E and mid-region D are respectively shown in FIGS. 4B and 4C.

Figure 4B:
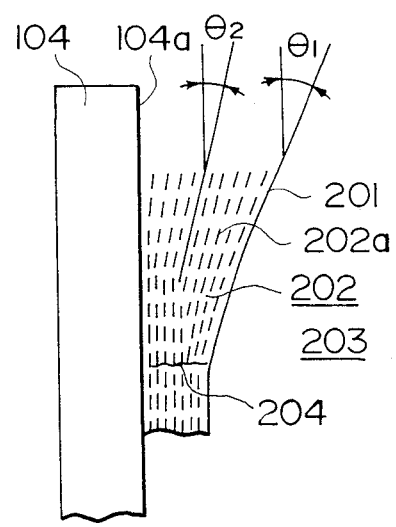
Figure 4C:
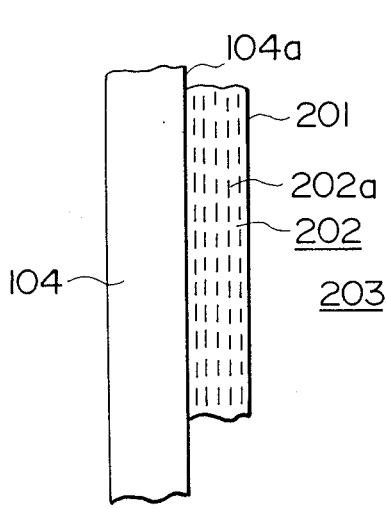

As shown in FIG. 4B, SmA phase 202 comprises liquid crystal molecules having a long axis 202a in end region E. As will be understood from the same figure, in a case where phase boundary 201 inclines with respect to side wall 104a with a large angle ($\theta_1$), the liquid crystal molecules are oriented not in parallel with side wall 104a but with an inclination at an angle of $\theta_2$ ($\theta_2 \approx \theta_1$). This may be attributable to a tendency that liquid crystal molecules 202 are oriented in a direction perpendicular to the growth direction of the SmA phase. Further, in a region where the inclination angle $\theta_1$ of phase boundary 201 abruptly changes, liquid crystal molecules cannot be fully in alignment but are divided into separate domains in which molecular orientations are different from each other and between which a defect line as shown by reference numeral 204 appears. On the other hand, as shown in FIG. 4C, SmA phase 202 in mid region D comprises liquid crystal molecules having axes 202 parallel to both phase boundary 201 and side wall 104a, whereby a uniform monodomain is formed.

Figure 4D:
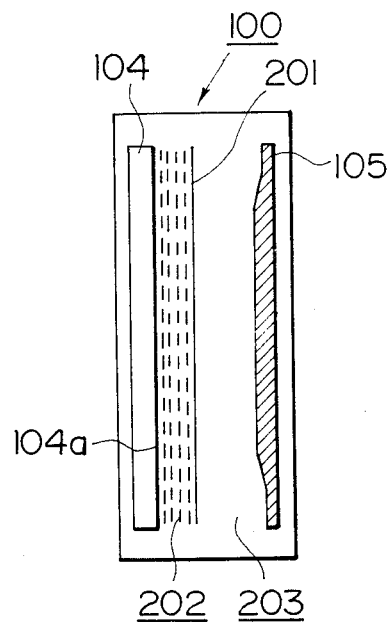
FIG. 4D is a plan view showing another embodiment of the liquid crystal device used in the present invention.

FIG. 4D shows an improved configuration of heating member 105 for overcoming the above problem. As shown in the figure, a stripe-form heating member 105 has end portions with narrower widths having increased resistances and therefore generating locally increased heat quantities, whereby the temperature of liquid crystal cell 100 is uniformized along the longitudinal direction. Therefore, phase boundary 201 between SmA phase 202 and isotropic phase 203 becomes parallel to side wall 104a, and an entirely uniform monodomain is formed.

In the above described manner, the orientation can be completed. However, even when a monodomain appears to be formed uniformly at a glance, non-uniformity in optical contrast or response speed can occasionally occur depending on regions when the cell is examined with respect to switching characteristics as a liquid crystal optical modulation device by actually applying voltages between electrodes 102 and 102a. This phenomenon may be attributable to a structural strain due to the temperature gradient provided at the time of orientation treatment. In order to cope with this difficulty, it is effective to raise the temperature of the case once after the orientation process thereby to transform the liquid crystal once from the SmC* phase to SmA phase and then decrease the temperature of the case to re-form the SmC* phase, whereby the above-mentioned strain can be removed due to structural relaxation.

Figure 5:
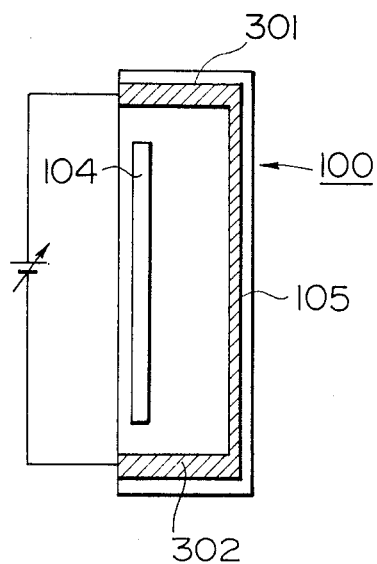
FIG. 5 is a plan view showing still another embodiment of the liquid crystal cell used in the present invention.

FIG. 5 shows another embodiment of the heating member for removing the difficulty during the formation of the temperature gradient in the orientation process that the temperature of the liquid crystal cell is lower in the end regions than the mid regions. Heating member has additional extended portions 301 and 302 for heating the end regions of liquid crystal cell 100, whereby the temperature decrease in the end regions is compensated. Thus, by disposing heating members 105, 301 and 302 along the periphery of the liquid crystal cell, a uniform monodomain of SmA phase can be formed.

Figure 6:
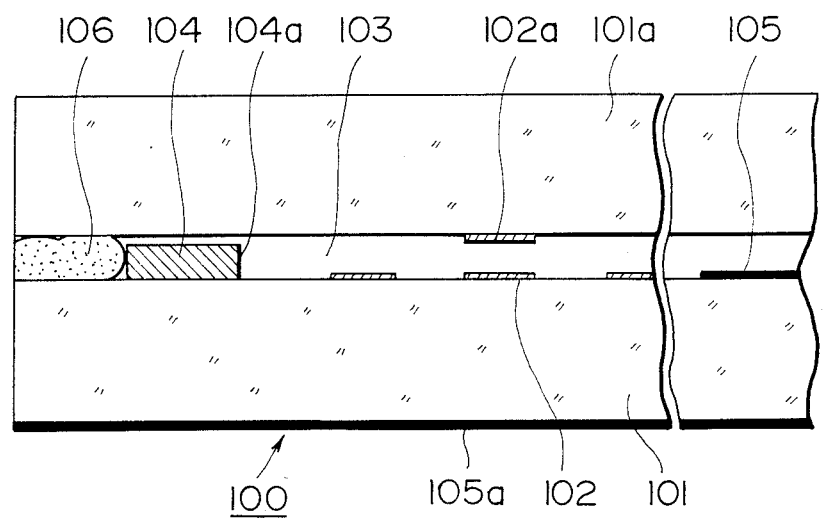

FIG. 6 shows another embodiment according to the present invention, wherein an additional heating member 105a is provided on the back side of base plate 101. Heating member 105a is disposed to heat the entirety of cell 100 and is used in combination with heating member 105 for reorientation of the liquid crystal layer through the prescribed steps, where some irregularity in orientation of the liquid crystal occurs due to some trouble during actual use as an optical modulation device. It is of course possible that such a heating member 105a is also provided on the backside of base plate 101a. According to this embodiment, SmC* phase obtained in the above-described manner is once transformed into SmA phase throughout liquid crystal cell 100 by energizing heating member 105a and is gradually cooled to form SmC* phase, whereby a uniform monodomain is again formed.

Figure 7:
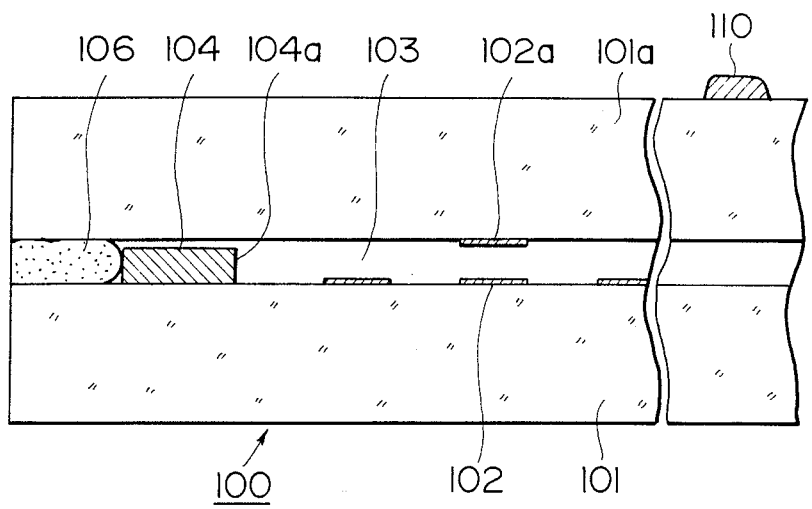

FIG. 7 shows an embodiment wherein a heating member 110 of such a material as ITO or Ni-Cr alloy film is formed outside base plate 101a instead of the above-mentioned heating member 105. Heating member 110 should preferably have the shapes as explained in FIG. 4D and FIG. 5.

Figure 8:
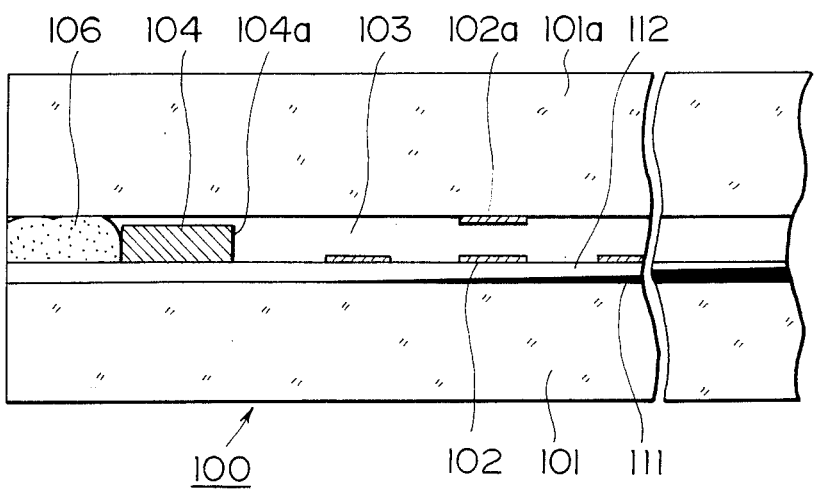

FIG. 8 shows a liquid crystal cell 100 wherein a heating member 111 having a wedge-shaped section with a thickness gradient and made of ITO or Ni-Cr film is formed instead of the above described heating member 105.

When a certain voltage is applied along the longitudinal direction (the thickness direction of the drawing) of this liquid crystal cell 100, there is formed a temperature gradient such that the temperature increases from the vicinity of side wall 104a toward the direction perpendicular thereto. In this case, it is desirable to dispose an insulating film 112 of an organic material such as polyimide or inorganic material such as $SiO_2$ between heating member 111 and electrodes 102.

In preparation of the liquid crystal device of the present invention, a spacer may be used in order to regulate the thickness of the liquid crystal layer at a predetermined value. FIG. 9 shows an example of the liquid crystal device provided with such spacers. The liquid crystal device shown in FIG. 9 comprises a base plate 101 with a pattern of transparent electrodes 102, a base plate 101a disposed to face base plate 101 and spacer members 113 formed between base plates 101 and 101a, whereby the thickness of liquid crystal 103 disposed therebetween is stably kept constant. Spacer members 113 may be formed by forming a coating film of an electrically insulating material on either one of the base plates in a predetermined thickness and applying thereto photolithographic techniques to leave the structures as shown in the figure.

In preparation of the liquid crystal device, when an isotropic phase of DOBAMBC is provided with a temperature gradient by means of heating member 105 and is cooled while maintaining such a temperature gradient, a monodomain of SmA phase grows from side wall 104a of nucleus generating member 104 to a side wall 113a of spacer 113 and a monodomain of SmA phase also grows from the other side wall 113b of spacer 113 which is able to have an effect of generating nuclei of liquid crystal like that of the above mentioned side wall 104a. A plurality of spacers 113 may be formed in the form of stripes simultaneously with the formation of and from the same material as nucleus generating member 104.

The method of controlling orientation of a liquid crystal, according to another preferred generic embodiment thereof, comprises: providing a monoaxial orientation controlling member between a pair of base plates and contiguous with a liquid crystal interposed between the pair of base plates; forming a monoaxially anisotropic phase (smectic phase, nematic phase) of the liquid crystal wherein liquid crystal molecules are first aligned in one direction in the vicinity of a boundary with the above mentioned monoaxial orientation controlling member to leave a different phase (e.g., isotropic, nematic or cholesteric phase) of the liquid crystal which is a higher temperature phase than said monoaxially anisotropic phase with a phase boundary therebetween; transforming a part of the different phase adjacent to the phase boundary under temperature decrease into the monoaxially anisotropic phase where liquid crystal molecules are aligned in parallel with the alignment direction of the liquid crystal molecules in the aforesaid monoaxially anisotropic phase; and successively causing the phase transformation from the phase boundary in a direction perpendicular to the phase boundary, thereby to form a monodomain of the liquid crystal wherein the liquid crystal molecules are aligned in one direction.

Figure 13A:
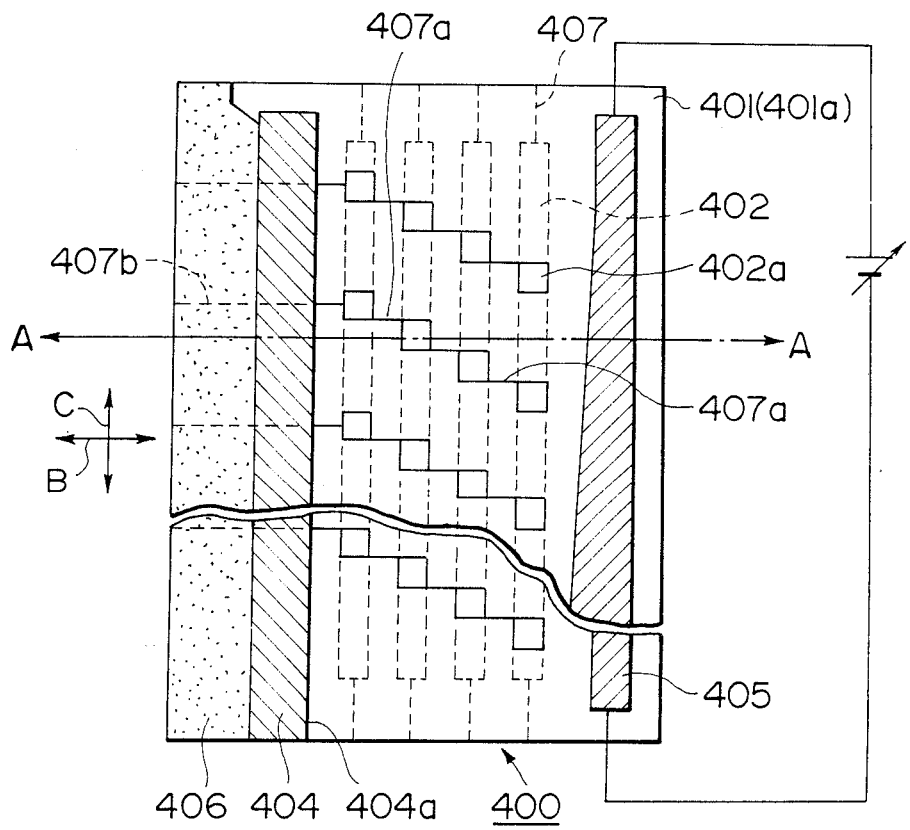
FIG. 13A is a plan view of a liquid crystal device used in the present invention.

FIG. 13A shows a partial plan view, similar to FIG. 3A, illustrating another example of a liquid crystal device obtained through the orientation controlling method of the present invention and FIG. 13B is a sectional view, similar to FIG. 3B, taken along the line A—A in FIG. 13A.

A cell 400 shown in FIGS. 13A and 13B comprises a pair of base plates 401 and 401a made of glass or plastic plates and held by a spacer (not shown) to leave a predetermined gap. These base plates are bonded to each other with an adhesive 406 to give a cell structure. On base plate 401 are disposed a plurality of transparent electrodes 402 forming a group of electrodes which are formed in a predetermined pattern such as a stripe pattern. On base plate 401a are formed a plurality of transparent electrodes 402a intersecting with the above mentioned transparent electrodes 402 and forming another group of electrodes which are formed in segments disposed in a staggered fashion and connected with leads 107a. Transparent electrodes 402 and 402a are connected to leads 407 and leads 407b, respectively. Signals from an external circuit are respectively applied to the terminals of respective leads 407 and 407b.

Base plates 401 and 401a are similar to base plates 101 and 101a explained by referring to FIG. 3A. Likewise, a similar insulating film may be formed on base plates 401 and 401a.

The cell structure shown in this example comprises the above mentioned layer of liquid crystal 403 showing ferroelectricity in a specific temperature range, a monoaxial orientation controlling member 404 and a heat generating member 405 such as a heater.

Sidewall 404a of monoaxial orientation controlling member 404 has a function of monoaxially orienting liquid crystal molecules and may be composed of a cut film face of a material such as a polyester and a polyimide to which a rubbing effect has been imparted by cutting the film with a metal blade. In another example, monoaxial orientation controlling member 404 may be formed by first forming a film of a resin such as polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, cellulose resin, melamine resin, urea resin or acrylic resin and then by etching the film with, for example, an oblique ion beam to impart a monoaxial orientation effect, or alternatively by forming a pattern film of an inorganic material such as SiO and $SiO_2$ formed by the oblique vapor deposition.

Figure 14B:
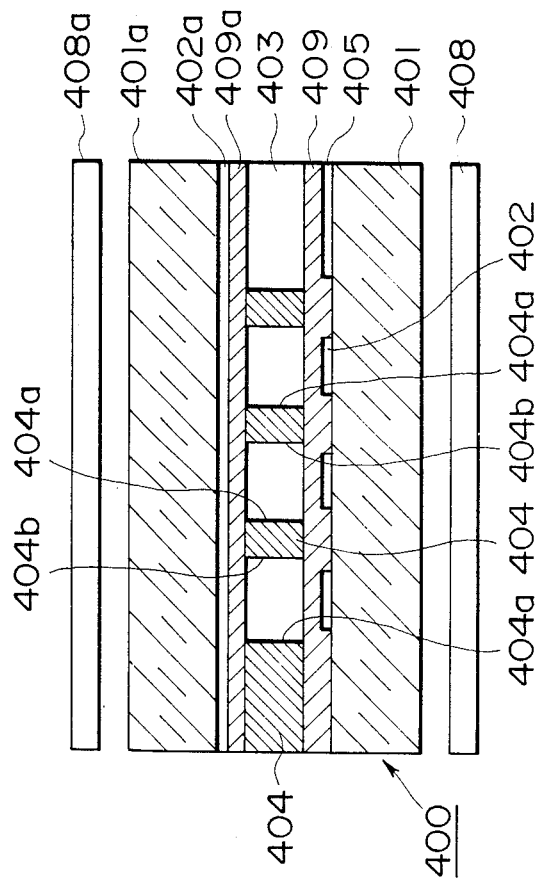
FIG. 14A is a perspective view showing another embodiment of the liquid crystal device of the present invention and is a sectional view thereof.

In a preferred embodiment of the present invention, as shown in FIGS. 14A and 14B, a plurality of monoaxial orientation controlling members 404 are formed in a cell structure and are caused to function also as spacers. A liquid crystal cell 400 shown in FIGS. 14A and 14B comprises a base plate 401 of glass, plastic etc., on which a plurality of electrodes (e.g. scanning electrodes) are formed in a predetermined pattern by etching. An insulating film 409 is formed on electrodes 402 and a plurality of monoaxial orientation controlling members 404 are formed on insulating film 409. In this case, it is preferred to form member 404 of a material having a lower hardness than insulating film 409. More specifically, members 409 may be formed in the form of stripes by first forming a film of a resin such as polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, cellulose resin, melamine resin, urea resin or acrylic resin, or a functional resin such as photosensitive polyimide, photosensitive polyamide, cyclic rubber-type photoresist, phenol novolak-type photoresist or electron beam-resist such as polymethyl methacrylate and epoxidized, 1,4-polybutadiene, or an inorganic compound such as SiO, $SiO_2$ or $TiO_2$, and subjecting the film to an ordinary photolithographic process.

On the other hand, insulating film 409 is selected from materials capable of preventing occurrence of electric currents flowing into the layer of liquid crystal 403 having bistability and having a hardness higher than that of the above mentioned monoaxial orientation controlling members 404. For instance, insulating film 409 may be formed by using compounds selected from silicon nitride, silicon nitride containing hydrogen, silicon carbide, silicon carbide containing hydrogen, boron nitride, boron nitride containing hydrogen, cerium oxide, silicon oxide, aluminum oxide, zirconium, magnesium fluoride, etc. Insulating film 409 can also provide an advantage of preventing occurrence of electric currents produced due to a small amount of impurities, etc. contained in liquid crystal layer 403. Accordingly, insulating film 403 prevents a liquid crystal compound from deteriorating even after repeated operation of the device. The thickness of insulating film 409 is usually set to a range of from 50 Å to 5μ, preferably from 500 Å to 5000 Å, although it depends upon the electron injection preventing ability inherent to the material used and the thickness of liquid crystal layer 403. On the other hand, the thickness of the liquid crystal layer is determined in accordance with the height of the monoaxial orientation controlling members 404 and is usually set to a range of from 0.2μ to 200μ, preferably from 0.5μ to 10μ, although it somewhat depends upon the easiness of orientation inherent to a liquid crystal material used and response speed required for a device. The width of monoaxial orientation controlling member 404 is set to a range of usually from 0.5μ to 50μ, preferably from 1μ to 20μ. The pitch (distance) between adjacent orientation controlling members 404 is usually set to a range of from 10μ to 2 mm, preferably from 50μ to 700μ, because if it is too large, the uniform orientation of liquid crystal molecules is prevented and, if it is too small the valid area of a liquid crystal optical device is reduced.

The rubbing treatment is implemented to base plate 401 comprising monoaxial orientation controlling members 404 and insulating film 409, for instance, along stripe lines of orientation controlling members 404 with velvet, cloth, paper, etc. This rubbing treatment can provide a wall effect for orienting the liquid crystal preferentially in one direction with respect to side walls 404a and 404b of each orientation controlling member 404. Accordingly, side walls 404a and 404b thus rubbed can provide the wall effect for the orientation of the liquid crystal. In this instance, the liquid crystal 403 having bistability in contact with side walls 404a and 404b is horizontally aligned or oriented in a direction parallel or substantially parallel to base plate 401, i.e. in the rubbing direction ("homogeneous orientation"), since insulating film 409 does not have a wall effect for preferentially orienting the liquid crystal or has only a weak wall effect, as described later.

As stated above, insulating film 409 is formed of a material selected from materials having a hardness higher than that of monoaxial orientation controlling members 404. Accordingly, even if insulating film 409 is rubbing-treated, the surface thereof does not have a preferential direction for orienting the liquid crystal in contact therewith to a third, metastable or strongly stable state directed in one direction.

In a specific embodiment of practice, such monoaxial orientation controlling members were formed in the following manner.

A film of silicon carbide containing hydrogen (SiC:H) was formed on a glass base plate on which stripe-shaped pattern electrodes had been formed with ITO (Indium-Tin-Oxide) by the plasma CVD (Chemical Vapor Deposition) process as stated below. The glass base plate having the pattern electrodes was placed on the anode side of a plasma CVD device of a parallel plate electrode type. The system was evacuated and the glass plate was heated to 200° C. Then, SiH4 gas and CH4 gas were introduced into a reactor under controls such that their volume flow rates were 10 sccm and 300 sccm, respectively. The gas pressure was about 0.2 Torr. Then, a high frequency power supply of 13.56 MHz was turned on to apply a voltage on the cathode side of the parallel plate electrodes, thereby causing a glow discharge to start a reaction. After about 10 min., a film or SiC:H having a thickness of about 2000 Å was formed on the base plate.

Then, a polyimide forming solution ("PIQ" manufactured by Hitachi Kasei Kogyo K.K., non-volatile matter content of 14.5 wt. %) was coated on the film of SiC:H in 10 sec. with a spinner coater rotating at 3000 rpm and thereafter heated at a temperature of 120° C. for 30 min. to form a coating having a thickness of 2μ.

Then, a positive-type resist solution ("AZ 1350" manufactured by Shipley Company, Ltd.) was spinner-coated on the resultant coating and prebaked. The resist layer was exposed to light through a mask. Then, by developing the resist with a developer "MF 132" containing tetramethyl ammonium hydroxide, the resist film of the exposed portion and the polyimide film located therebelow were etched to form throughholes. After the base plate thus treated was washed and dried, the resist film of non-exposed portions was removed with methyl ethyl ketone. Thereafter, the polyimide film was cured by heating at 200° C. for 60 min. and at 350° C. for 30 min. to form monoaxial orientation controlling members of PIQ (Polyimide).

Then, the base plate was rubbed with a cloth in the arrangement direction of the stripe-shaped orientation controlling members and washed successively with water and acetone. After being dried, the base plate was immersed in a 1% aqueous solution of a silane coupling agent ("KBM 403" manufactured by Shinetsu Kagaku Kogyo K.K.), pulled up therefrom and heat-dried to form an electrode plate.

As shown in FIGS. 14A and 14B, on base plate 402a having electrodes 402a, an insulating film 409a is also formed of a material selected from the above mentioned resins or inorganic compounds.

In another preferred embodiment of the invention, a monoaxial orientation controlling member may be formed by a monoaxially highly-oriented fiber obtained by spinning a polymer liquid crystal such as an anisotropic polymer solution (rheotropic liquid crystal) or an anisotropic molten polymer (thermotropic liquid crystal) into fiber. As the polymer liquid crystal used for this purpose, those having a nematic or smectic phase are suitable. Monoaxial orientation controlling member 404 thus obtained is in a highly oriented state and a liquid crystal having bistability contacting side wall 404a and 404b thereof can be orientation-controlled to form a stable monodomain.

Typical examples of the highly oriented fiber formed from a polymer liquid crystal include fibers obtained by spinning a sulfuric acid solution of poly-p-phenyleneterephthalamide and a dimethylacetamide solution of poly-p-benzamide in the liquid crystal state. Other examples of the highly oriented fiber include those obtained from polymer liquid crystals such as a liquid crystal solution of poly-amidehydrazide and polyhydrazide in sulfuric acid, fluorosulfuric acid or a mixture of these acids, a liquid crystal solution of poly-p-phenylenebenzo-bis-oxazole and poly-p-phenylenebenzo-bis-thiazole in polyphosphoric acid, methylsulfonic acid, etc., a liquid-crystallic molten liquid of a polyester of p-hydroxybenzoic acid, 1,2-bis(p-carboxyphenoxy)ethane, terephthalic acid and substituted or non-substituted hydroquinone, a liquid-crystalline molten liquid of a polyester of p-hydroxybenzoic acid, 1,2-bis(p-carboxy)ethane, terephthalic acid and bisphenol A or bisphenol A diacetate, and a liquid-crystalline molten liquid of a polyester represented by the following formula (1) or (2):

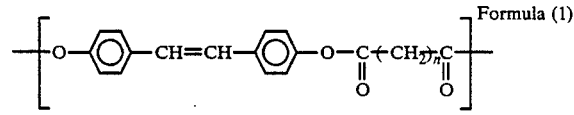

Formula (1)

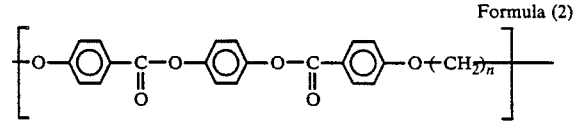

Formula (2)

wherein n ranges from 2 to 11.

When the highly oriented fiber is used as a monoaxial orientation controlling member 404, a liquid crystal contacting the oriented surface of the fiber can be aligned or oriented along the orientation direction of the fiber.

Heat generating member 405 may suitably be a film resistor such as that of indium oxide, tin oxide or ITO.

When liquid crystal cell 400 is sandwiched between polarizers 408 and 408a which are disposed on both sides of base plates 401 and 401a in a cross nicol or parallel nicol arrangement and voltages are applied between electrodes 402 and 402a, an optical modulation function is attained.

A more specific example of liquid crystal cell 400 shown in FIGS. 13A and 13B is explained. In a preferred example, transparent electrodes 402 form a group of scanning electrodes in the form of stripes each having a width of 62.5 μm, while transparent electrodes 402a provide a group of signal electrodes each forming a picture element measuring 62.5 μm×62.5 μm. Heat generating member 405 comprises an ITO film of 0.6 mm in average width and 1000 Å in thickness, while the thickness of liquid crystal layer 403 is preferably kept at 2 μm.

Liquid crystal cell 400 is contained in a heating case (not shown) and interposed between a pair of polarizers 408 and 408a arranged to have polarizing directions crossing at right angles. This combination may be used as a liquid crystal shutter array for an electrophotographic printer. In this case, arrow B in FIG. 13A corresponds to the rotational direction of a photosensitive drum for the electrophotography.

Hereinbelow, a method of controlling the orientation of liquid crystal layer 403 is more specifically explained with reference to FIGS. 13A and 13B and an example wherein a liquid crystal material DOBAMBC showing ferroelectricity at specific temperature is used.

A liquid crystal cell 400 hermetically containing DOBAMBC is set in a heating case (not shown) so that the entire cell can be heated. Then, the temperature of the heating case is controlled so that the average temperature of the cell will be, e.g., 90° C. At this time, DOBAMBC assumes a liquid crystal phase of SmC* or SmA. Then, an electric current is passed through a heater 405 and gradually increased, whereby a portion of the liquid crystal in a close vicinity of heater 405 exceeds the transformation temperature from SmA to isotropic phase of about 118° C. and is transformed into the isotropic phase, i.e., a liquid state. On further increase in electric current, the isotropic region gradually extends while maintaining its boundary substantially in parallel with heating member 405 until the entirety of liquid crystal layer 403 assumes the isotropic phase.

In this state, the temperature in the lontitudinal direction (C direction in FIG. 13A) of the liquid crystal state is uniform, and there is formed a temperature gradient in the transverse direction (B direction in FIG. 13B) such that the temperature gradually increases from monoaxial orientation controlling member 104 to heating member 405. For example, such a temperature gradient is formed that the temperature in the vicinity of side wall 404a of orientation controlling member 404 is about 120° C. and the temperature in the vicinity of heating member 405 apart therefrom by about 1.5 mm is about 140° C.

Then, from the condition where the above temperature gradient has been imparted to cell 400, the temperature of the case in which cell 400 is set is gradually decreased from 90° C. at a rate of, e.g., 10° C./h, whereby the temperature in the vicinity of side wall 404a of orientation controlling member 404 first becomes lower than the transformation temperature from isotropic to SmA of about 116° C., and a nucleus of SmA phase is formed in this region.

In this case, because both side wall 404a of monoaxial orientation controlling member and face 410 of base plate 401 have functions of horizontally orienting the liquid crystal molecules, when the SmA phase is formed in the vicinity of side wall 404a, such a regulating force is applied to the liquid crystal molecular axes that the axes will align parallel to both face 410 of base plate 401 and he longitudinal direction of side wall 404a, whereby the resultant nucleus of SmA forms a monodomain oriented horizontally with respect to side wall 404a and face 410 of base plate 401. On further decrease in temperature of the case, a portion of the isotropic phase in the vicinity of the phase boundary between the already formed SmA phase and the isotropic phase causes a transformation into an SmA phase having an alignment or orientation direction in parallel with that of the already formed SmA phase. As a result, on continuing the temperature decrease with a temperature gradient, the monodomain region of SmA phase continuously spreads. Herein, it is preferred that the growing or spreading speed of the phase boundary between the monodomain region and the isotropic phase region is uniform along the longitudinal direction of liquid crystal cell 400 (C direction in FIG. 13A). When the case is cooled to a temperature of the order of, e.g., 70° C. substantially the entire region of the liquid crystal except for the close vicinity of heating member 405 is transformed into SmA phase.

Then, the electric current applied to the heating member is gradually decreased to remove the temperature gradient, whereby the temperature of the entire liquid crystal cell 400 is uniformly 70° C. and the liquid crystal is transformed into SmC*. In this case, while liquid crystal molecules in the vicinity of heating member 405 can sometimes assume a random alignment, a uniform monodomain is maintained in the region where electrodes 402 and 402a are disposed.

Further, when a liquid crystal device as shown in FIG. 14 is provided with a temperature gradient and subjected to temperature decrease while maintaining the temperature gradient, a monodomain of SmA phase grows from side wall 404a of the leftmost monoaxial orientation controlling member 404 to another side wall 404b of the next orientation controlling member 404, and a monodomain of SmA also grows from the other side wall 404a of the above-mentioned next orientation controlling member in the right direction of the figure.

It is important in the above-mentioned orientation controlling method that the temperature is uniform in direction C. while giving as large a temperature gradient as possible in direction B in FIG. 13A. This point will be explained by referred to FIGS. 15A to 15D.

FIG. 15A is a plan view schematically illustrating the stage of growth of SmA phase during gradual temperature decrease for developing SmA phase in a cell wherein a heating member 405 is formed in a stripe form according to the above described method. In the figure, reference numeral 501 denotes a phase boundary between the SmA phase region and the isotropic phase region. When heating member 405 has a linear stripe phase having a uniform width as shown in the figure, the temperature in the cell is lower in an end region E then an mid-region D along the longitudinal direction of cell 400 unless there is a special contrivance in a case (not shown) housing the cell. Therefore, phase boundary 501 grows substantially parallel to side wall 404a of orientation controlling member 404 in the neighborhood of mid-region D, whereas it grows with an inclination in end region E as illustrated. The appearances of liquid crystal molecule alignments in end region E and mid region D are respectively shown in FIG. 15B and FIG. 15C.

As shown in FIG. 15B, SmA phase 502 comprises liquid crystal molecules having a long axis 502a end region E. As will be understood from the same figure, in a case wherein phase boundary 501 inclines with respect to side wall 404a with a large angel ($\theta_1$), the liquid crystal molecules are oriented not in parallel with side wall 404a but with an inclination at an angle of $\theta_2$ ($\theta_2 \approx \theta_1$). This may be attributable to a tendency that liquid crystal molecules 502 are oriented in a direction perpendicular to the growth direction of SmA phase. Further, in a region where the inclination angle $\theta_1$ of phase boundary 501 abruptly changes, liquid crystal molecules cannot be fully in alignment but are divided into separate domains in which molecular orientations are different from each other and between which a defect line as shown by reference numeral 504 appears. On the other hand, as shown in FIG. 15C, SmA phase 502 in mid region D comprises liquid crystal molecules having axes 502a parallel to both phase boundary 501 and side wall 404a, whereby a uniform monodomain is formed.

FIG. 15D shows an improved configuration of heating member 405 for overcoming the above problem. As shown in the figure, a stripe-form heating member 405 has end portions with narrower widths having increased resistances and therefore generating locally increased heat quantities, whereby the temperature of liquid crystal cell 400 is uniformized along the longitudinal direction. Therefore, the phase boundary 501 between SmA phase 502 and isotropic phase 503 becomes parallel to side wall 404a, and an entirely uniform monodomain is formed.

In the above described manner, the orientation can be completed. However, even when a monodomain appears to be formed uniformly at a glance, non-uniformity in optical contrast or response speed can occasionally occur depending on regions when the cell is examined with respect to switching characteristics as a liquid crystal optical modulation device by actually applying voltages between electrodes 102 and 102a. This phenomenon may be attributable to a structural strain due to the temperature gradient provided at the time of orientation treatment. In order to cope with this difficulty, it is effective to raise the temperature of the case once after the orientation process thereby to transform the liquid crystal once from the SmC* phase to SmA phase and then decrease the temperature of the case to re-form the SmC* phase, whereby the above-mentioned strain can be removed due to structural relaxation.

Figure 16:
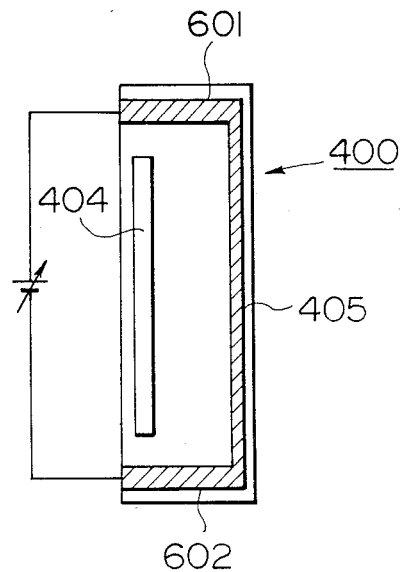
FIG. 16 is a plan view showing a still further embodiment of the liquid crystal cell used in the present invention.

FIG. 16 shows another embodiment of the heating member for removing the difficulty during the formation of the temperature gradient in the orientation process that the temperature of the liquid crystal cell is lower in the end regions than the mid-regions. Heating member 405 has additional extended portions 601 and 602 for heating the end regions of liquid crystal cell 400, whereby the temperature decrease in the end regions is compensated. Thus, by disposing heating members 405, 601 and 602 along the periphery of the liquid crystal cell, a uniform monodomain of SmA phase can be formed.

Figure 17:
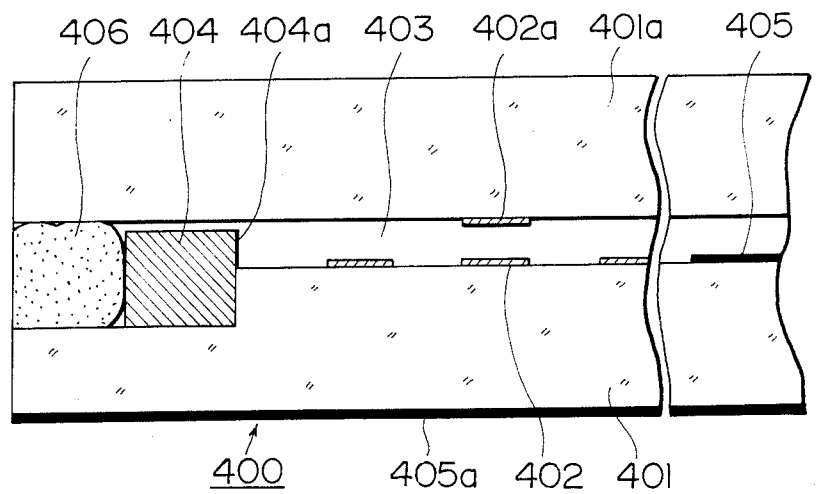
FIGS. 17, 18 and 19 are sectional views respectively showing a preferred embodiment of the liquid crystal cell of the present invention.

FIG. 17 shows another embodiment according to the present invention, wherein an additional heating member 405a is provided on the back side of base plate 401. Heating member 405a is disposed to heat the entirety of cell 400 and is used in combination with heating member 405 for reorientation of the liquid crystal layer through the prescribed steps, where some irregularity in orientation of the liquid crystal occurs due to some kind of trouble during actual use as an optical modulation device. Thus, according to this embodiment, SmC* phase obtained in the above described manner is once transformed into SmA phase throughout liquid crystal cell 400 by actuating heating member 405a and is gradually cooled to form SmC* phase, whereby a uniform monodomain is again formed. It is of course possible that such a heating member 405a is also provided on the backside of base plate 401a.

Figure 18:
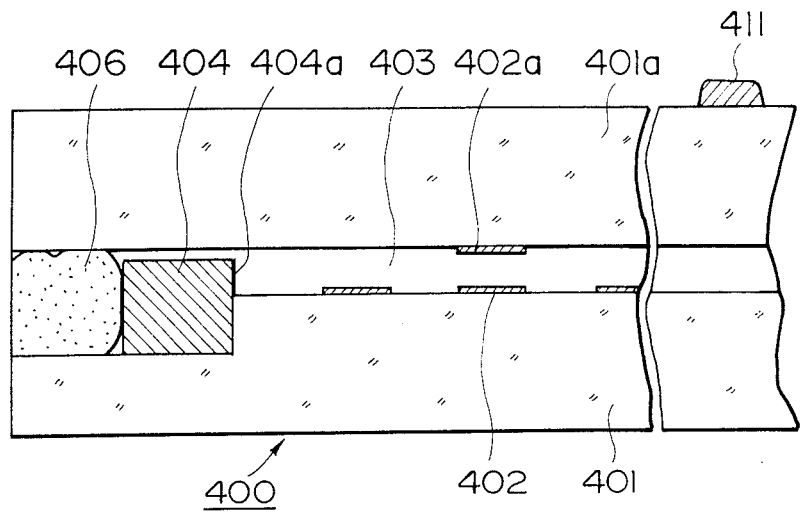

FIG. 18 shows an embodiment wherein a heating member 411 of such a material as ITO or Ni-Cr alloy film is formed outside base plate 401a instead of the above-mentioned heating member 405. Heating member 411 should preferably have the shapes as explained in FIG. 15D and FIG. 16.

Figure 19:
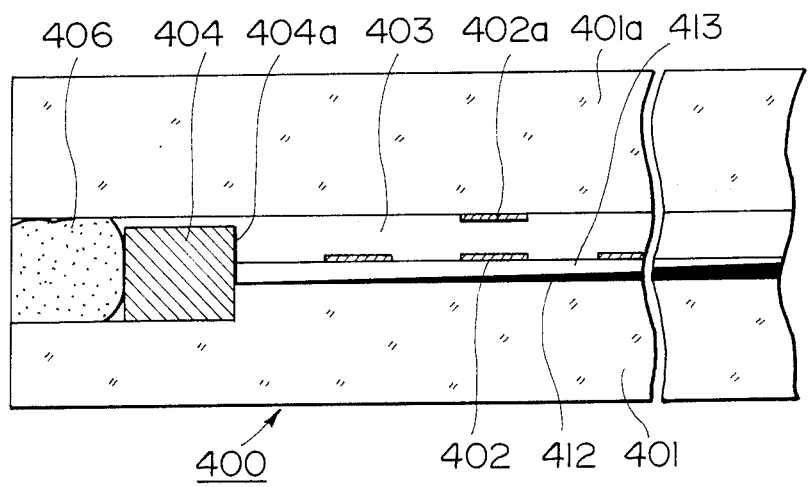

FIG. 19 shows a liquid crystal cell 400 wherein a heating member 412 having a wedge-shaped section with a thickness gradient and made of ITO or Ni-Cr film is formed instead of the above described heating member 405.

When a certain voltage is applied along the longitudinal direction (the thickness direction of the drawing) of this liquid crystal cell 400, there is formed a temperature gradient such that the temperature increases from the vicinity of side wall 404a toward the direction perpendicular thereto. In this case, it is desirable to dispose an insulating film 413 of an organic material such as polyimide or inorganic material such as $SiO_2$ between heating member 412 and electrodes 402.

The method of controlling orientation of a liquid crystal according to still another preferred generic embodiment thereof, comprises: providing a cylindrical member between a pair of base plates and contiguous with a liquid crystal interposed between the pair of base plates; forming a monoaxially anisotropic phase (smectic phase, nematic phase) of the liquid crystal wherein liquid crystal molecules are first aligned in one direction in the vicinity of a boundary with the cylindrical member to leave a different phase (isotropic, nematic or cholesteric phase) of the liquid crystal which is higher temperature phase than said monoaxially anisotropic phase with a phase boundary therebetween; transforming a part of the different phase adjacent to the phase boundary under temperature decrease into the monoaxially anisotropic phase where liquid crystal molecules are aligned in parallel with the alignment direction of the liquid crystal molecules in the aforesaid monoaxially anisotropic phase; and successively causing the phase transformation from the phase boundary in a direction perpendicular to the phase boundary, thereby to form a monodomain of the liquid crystal wherein the liquid crystal molecules are aligned in one direction.

Figure 20A:
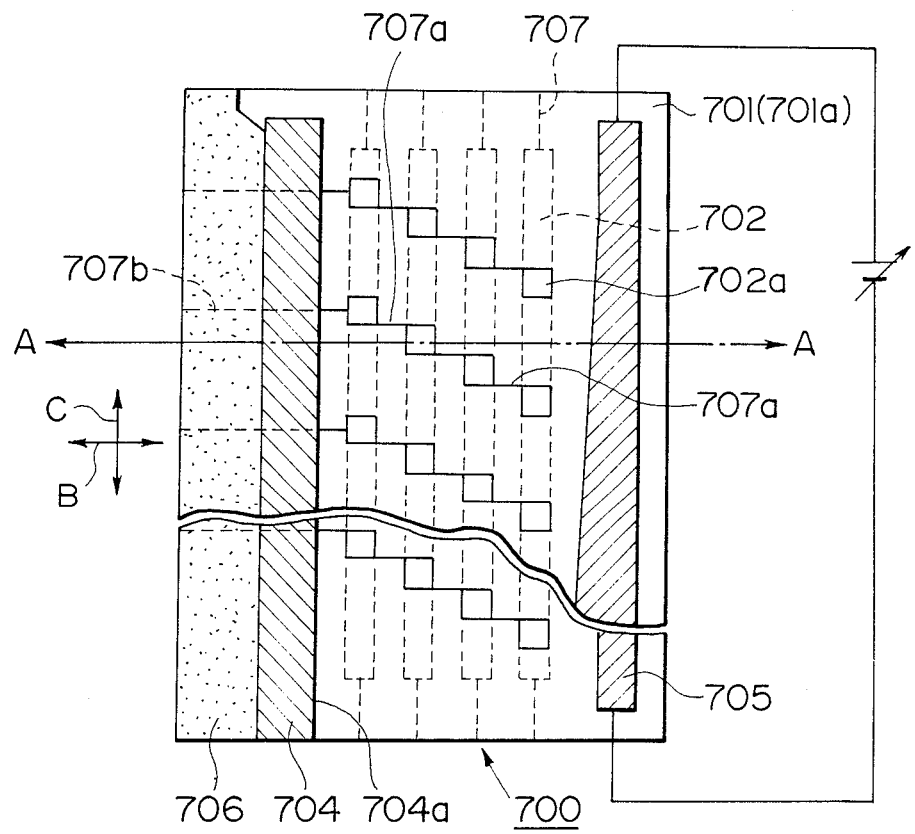
FIG. 20A is a plan view of a liquid crystal device used in the present invention.
Figure 20B:
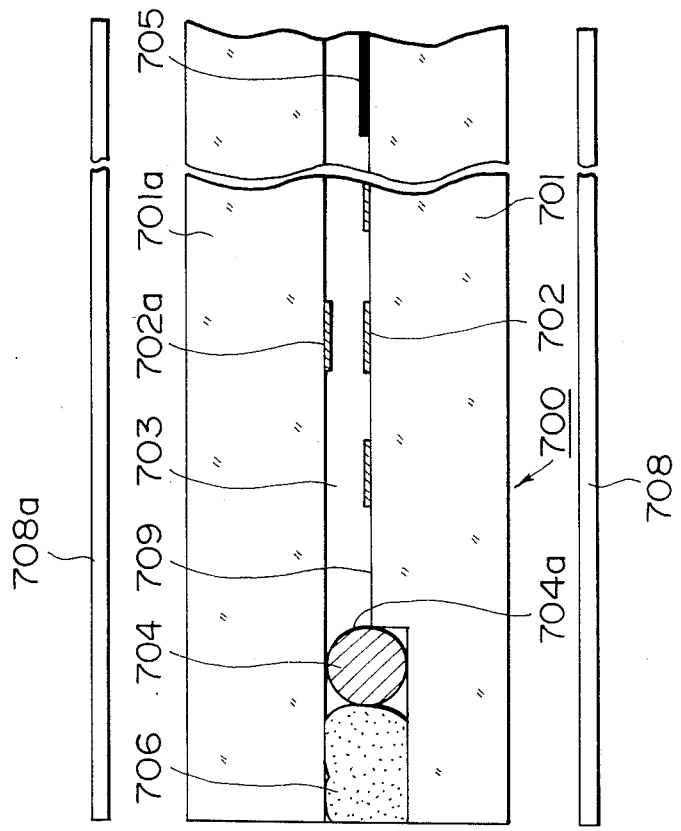
FIG. 20B is a sectional view taken along the line A—A.

FIG. 20A shows a partial plan view, similar to FIG. 3A, illustrating another example of a liquid crystal device obtained through the orientation controlling method of the present invention and FIG. 20B is a sectional view, similar to FIG. 3B, taken along the line A—A in FIG. 20A.

A cell 700 shown in FIGS. 20A and 20B comprises a pair of base plates 701 and 701a made of glass or plastic plates and held by a spacer (not shown) to leave a predetermined gap. These base plates are bonded to each other with an adhesive 706 to give a cell structure. On base plate 701 are disposed a plurality of transparent electrodes 702 forming a group of electrodes which are formed in a predetermined pattern such as a stripe pattern. On base plate 701a are formed a plurality of transparent electrodes 702a intersecting with the above mentioned transparent electrodes 702 and forming another group of electrodes which are formed in segments disposed in a staggered fashion and connected with leads 707a. Transparent electrodes 702 and 702a are connected to leads 707 and leads 707b, respectively. Signals from an external circuit are respectively applied to the terminals of respective leads 707 and 707b.

Base plates 701 and 701a are similar to base plates 101 and 101a explained by referring to FIG. 3A. Likewise, a similar insulating film may be formed on base plates 701 and 701a.

The cell structure shown in this example comprises the above mentioned layer of liquid crystal 703 showing ferroelectricity in a specific temperature range, a cylindrical member 704 and a heat generating member 705 such as a heater.

Cylindrical member 704 may suitably be a glass fiber having a curved side wall and preferably a round section. As shown in FIG. 20, cylindrical number 704 having an appropriate diameter of, e.g., 1 $\mu$m to 20 $\mu$m may be disposed at a lower step or cut-away portion of substrate 701.

Heat generating member 705 may suitably be a film resistor such as that of indium oxide, tin oxide or ITO.

When such a liquid crystal cell 700 is sandwiched between polarizers 708 and 708a which are disposed on both sides of base plates 701 and 701a in a cross nicol or parallel nicol arrangement, and voltages are applied between electrodes 702 and 702a, an optical modulation function is attained.

A more specific example of liquid crystal cell 700 shown in FIG. 20 is explained. In a preferred example, transparent electrodes 702 form a group of scanning electrodes in the form of stripes each having a width of 62.5 $\mu$m, while transparent electrodes 702a provide a group of signal electrodes each forming a picture element measuring 62.5 $\mu$m $\times$ 62.5 $\mu$m. Heat generating member 705 comprises an ITO film of 0.6 mm in average width and 1000 Å in thickness, while the thickness of liquid crystal layer 703 is preferably kept at 2 $\mu$m.

Liquid crystal cell 700 is contained in a heating case (not shown) and interposed between a pair of polarizers 708 and 708a arranged to have polarizing directions crossing at right angles. This combination may be used as a liquid crystal shutter array for an electrophotographic printer. In this case, arrow B in FIG. 20A corresponds to the rotational direction of a photosensitive drum for the electrophotography.

Hereinbelow, a method of controlling the orientation of liquid crystal layer 703 is more specifically explained with reference to FIGS. 20A and 20B and an example wherein a liquid crystal material DOBAMBC showing ferroelectricity at specific temperature is used.

A liquid crystal cell 700 hermetically containing DOBAMBC is set in a heating case (not shown) so that the entire cell can be heated. Then, the temperature of the heating case is controlled so that the average temperature of the cell will be, e.g., 90° C. At this time, DOBAMCB assumes a liquid crystal phase of SmC* or SmA. Then, a electric current is passed through a heater 705 and gradually increased, whereby a portion of the liquid crystal in a close vicinity of heater 705 exceeds the transformation temperature from SmA to isotropic phase of about 118° C. and is transferred into the isotropic phase, i.e., a liquid state. On further increase in electric current, the isotropic region gradually extends while maintaining its boundary substantially in parallel with heating member 705 until the entirety of liquid crystal layer 703 assumes the isotropic phase.

In this state, the temperature in the longitudinal direction (C direction in FIG. 20A) of the liquid crystal state is uniform, and there is formed a temperature gradient in the transverse direction (B direction in FIG. 20B) such that the temperature gradually increases from cylindrical member 704 to heating member 705. For example, such a temperature gradient is formed that the temperature in the vicinity of side wall 704a of cylindrical member 704 is about 120° C. and the temperature in the vicinity of heating member 705 apart therefrom by about 1.5 mm is about 140° C.

Then, from the condition where the above temperature gradient has been imparted to cell 700, the temperature of the case in which cell 700 is set is gradually decreased from 90° C. at a rate of, e.g., 10° C./h, whereby the temperature in the vicinity of side wall 704a of cylindrical member 704 first becomes lower than the transformation temperature from isotropic to SmA of about 116° C., and a nucleus of SmA phase is formed in this region.

In this case, because both side wall 704a of cylindrical member 704 and face 710 of base plate 701 have functions of horizontally orienting the liquid crystal molecules, when the SmA phase is formed in the vicinity of side wall 704a, such a regulating force is applied to the liquid crystal molecular axes that the axes will align parallel to both face 709 of base plate 701 and the longitudinal direction of side wall 704a, whereby the resultant nucleus of SmA forms a monodomain oriented horizontally with respect to side wall 704a and face 709 of base plate 701. On further decrease in temperature of the case, a portion of the isotropic phase in the vicinity of the phase boundary between the already formed SmA phase and the isotropic phase causes a transformation into an SmA phase having an alignment or orientation direction in parallel with that of the already formed SmA phase. As a result, on continuing the temperature decrease with a temperature gradient, the monodomain region of SmA phase continuously spreads. Herein, it is preferred that the growing or spreading speed of the phase boundary between the monodomain region and the isotropic phase region is uniform along the longitudinal direction of liquid crystal cell 700 (C direction in FIG. 20A). When the case is cooled to a temperature on the order of, e.g., 70° C., substantially the entire region of the liquid crystal except for the close vicinity of heating member 705 is transformed into SmA phase.

Then, the electric current applied to the heating member is gradually decreased to remove the temperature gradient, whereby the temperature of the entire liquid crystal cell 700 is uniformly 70° C. and the liquid crystal is transformed into SmC*. In this case, while liquid crystal molecules in the vicinity of heating member 705 can sometimes assume a random alignment, a uniform monodomain is maintained in the region where electrodes 702 and 702a are disposed.

It is important in the above mentioned orientation controlling method that the temperature is uniform in direction C while giving as large a temperature gradient as possible in direction B in FIG. 20A. This point will be explained by referring to FIGS. 21A to 21D.

FIG. 21A is a plan view schematically illustrating the stage of growth of SmA phase during gradual temperature decrease for developing SmA phase in a cell wherein a heating member 705 is formed in a stripe form according to the above-described method. In the figure, reference numeral 801 denotes a phase boundary between the SmA phase region and the isotropic phase region. When heating member 705 has a linear stripe shape having a uniform width as shown in the figure, the temperature in the cell is lower in an end region E than a mid-region D along the longitudinal direction of cell 400, unless there is a special contrivance in a case (not shown) housing the cell. Therefore, phase boundary 801 grows substantially parallel to side wall 704a of cylindrical member 704 in the neighborhood of mid-region D, whereas it grows with an inclination in end region E as illustrated. The appearances of liquid crystal molecule alignments in end region E and mid-region D are respectively shown in FIG. 21B and FIG. 21C.

As shown in FIG. 21B, SmA phase 802 comprises liquid crystal molecules having a long axis 802a in end region E. As will be understood from the same figure, in a case where phase boundary 801 inclines with respect to side wall 704a with a large angle ($\theta_1$), the liquid crystal molecules are oriented not in parallel with side wall 704a but with an inclination at an angle of $\theta_2$ ($\theta_2 \approx \theta_1$). This may be attributable to a tendency that liquid crystal molecules 802 are oriented in a direction perpendicular to the growth direction of SmA phase. Further, in a region where the inclination angle $\theta_1$ of phase boundary 801 abruptly changes, liquid crystal molecules cannot be fully in alignment but are divided into separate domains in which molecular orientations are different from each other and between which a defect line as shown by reference numeral 804 appears. On the other hand, as shown in FIG. 21C, SmA phase 802 in mid region D comprises liquid crystal molecules having axes 802a parallel to both phase boundary 801 and side wall 704a, whereby a uniform monodomain is formed.

FIG. 21D shows an improved configuration of heating member 705 for overcoming the above problem. As shown in the figure, a stripe-form heating member 705 has end portions with narrower widths having increased resistances and therefore generating locally increased heat quantities, whereby the temperature of liquid crystal cell 700 is uniformized along the longitudinal direction. Therefore, phase boundary 801 between SmA phase 802 and isotropic phase 803 becomes parallel to sidewall 704a, and an entirely uniform monodomain is formed.

In the above described manner, the orientation can be completed. However, even when a monodomain appears to be formed uniformly at a glance, non-uniformity in optical contrast or response speed can occasionally occur depending on regions when the cell is examined with respect to switching characteristics as a liquid crystal optical modulation device by actually applying voltages between electrodes 702 and 702a. This phenomenon may be attributable to a structural strain due to the temperature gradient provided at the time of orientation treatment. In order to cope with this difficulty, it is effective to raise the temperature of the case once after the orientation process thereby to transform the liquid crystal once from the SmC* phase to SmA phase and then decrease the temperature of the case to re-form the SmC* phase, whereby the above mentioned strain can be removed due to structural relaxation.

FIG. 22 shows another embodiment of the heating member for removing the difficulty during the formation of the temperature gradient in the orientation process that the temperature of the liquid crystal cell is lower in the end regions than the mid-regions. Heating member 705 has additional extended portions 901 and 902 for heating the end regions of liquid crystal cell 700, whereby the temperature decrease in the end regions is compensated. Thus, by disposing heating members 705, 901 and 902 along the periphery of the liquid crystal cell, a uniform monodomain of SmA phase can be formed.

FIG. 23 shows another embodiment according to the present invention, wherein an additional heating member 705a is provided on the back side of base plate 701. Heating member 705a is disposed to heat the entirety of cell 700 and is used in combination with heating member 705 for reorientation of the liquid crystal layer through the prescribed steps, where some irregularity in orientation of the liquid crystal occurs due to some kind of trouble during actual use as an optical modulation device. Thus, according to this embodiment, SmC* phase obtained in the above described manner is once transformed into SmA phase throughout liquid crystal cell 700 by actuating heating member 705a and is gradually cooled to form SmC* phase, whereby a uniform monodomain is again formed. It is of course possible that such a heating member 705a is also provided on the backside of base plate 701a.

Figure 24:
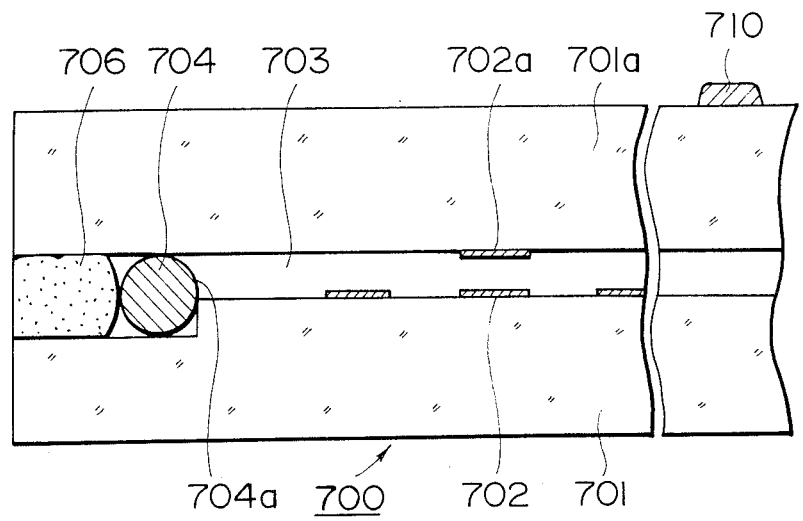

FIG. 24 shows an embodiment wherein a heating member 710 of such a material as ITO or Ni-Cr alloy film is formed outside base plate 701a instead of the above mentioned heating member 705. Heating member 711 should preferably have the shapes as explained in FIG. 21D and FIG. 22.

Figure 25:
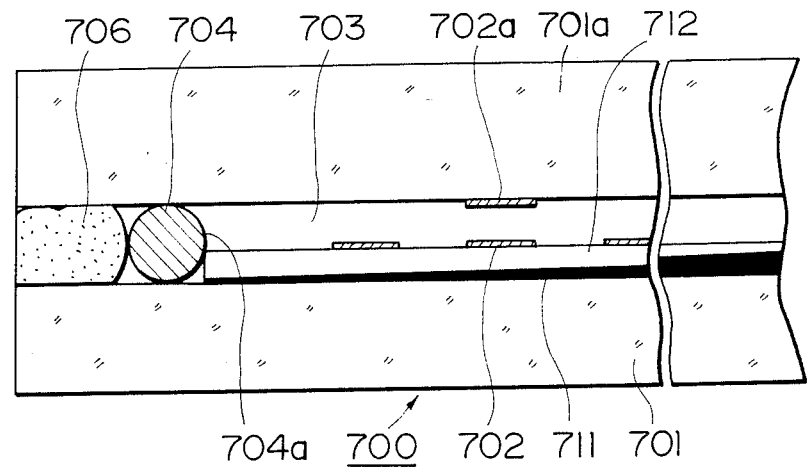

FIG. 25 shows a liquid crystal cell 700 wherein a heating member 711 having a wedge-shaped section with a thickness gradient and made of ITO or Ni-Cr film is formed instead of the above described heating member 705.

When a certain voltage is applied along the longitudinal direction (the thickness direction of the drawing) of this liquid crystal cell 700, there is formed a temperature gradient such that the temperature increases from the vicinity of side wall 704a toward the direction perpendicular thereto. In this case, it is desirable to dispose an insulating film 712 of an organic material such as polyimide or inorganic material such as $SiO_2$ between heating member 711 and electrodes 702.

Figure 26:
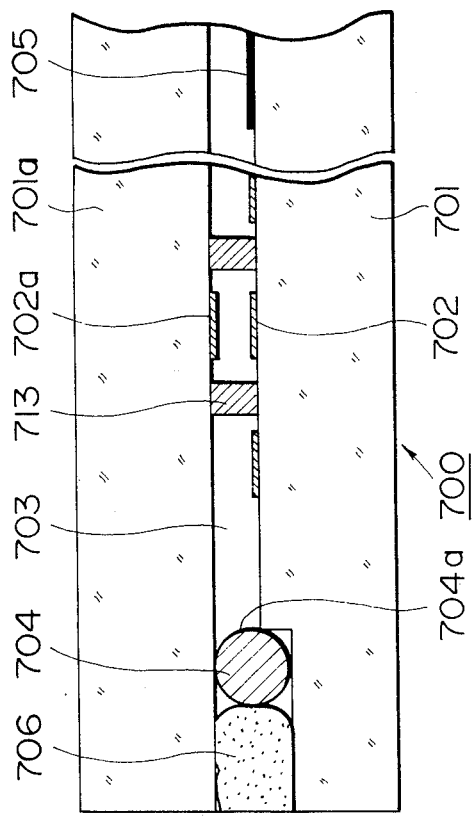

In preparation of the liquid crystal device of the present invention, a spacer may be used in order to regulate the thickness of the liquid crystal layer at a predetermined value. FIG. 26 shows an example of the liquid crystal device provided with such spacers. The liquid crystal device shown in FIG. 26 comprises a base plate 701 with a pattern of transparent electrodes 702, a base plate 701a disposed to face base plate 701 and spacer members 713 formed between base plates 701 and 701a, whereby the thickness of liquid crystal 703 disposed therebetween is stably kept constant. Spacer members 713 may be formed by forming a coating film of an electrically insulating material on either one of the base plates in a predetermined thickness and applying thereto photolithographic techniques to leave the structures as shown in the figure.

The method of controlling orientation of a liquid crystal according to still another preferred generic embodiment thereof, comprising: providing a cell structure having first and second ends and comprising a pair of base plates and a liquid crystal capable of forming a monoaxially anisotropic phase (e.g., smectic or nematic phase) at specific temperatures and a higher temperature phase (e.g., isotropic, nematic or cholesteric phase) at temperatures higher than said specific temperatures and, movable heating means capable of moving relative to the cell structure, and causing said movable heating member to move relative to the cell structure from the first end to the second end, whereby said liquid crystal is caused to form said higher temperature phase at portions heated by the movable heating members and then to form said monoaxial anisotropic during the subsequent temperature decreasing stage.

Figure 27A:
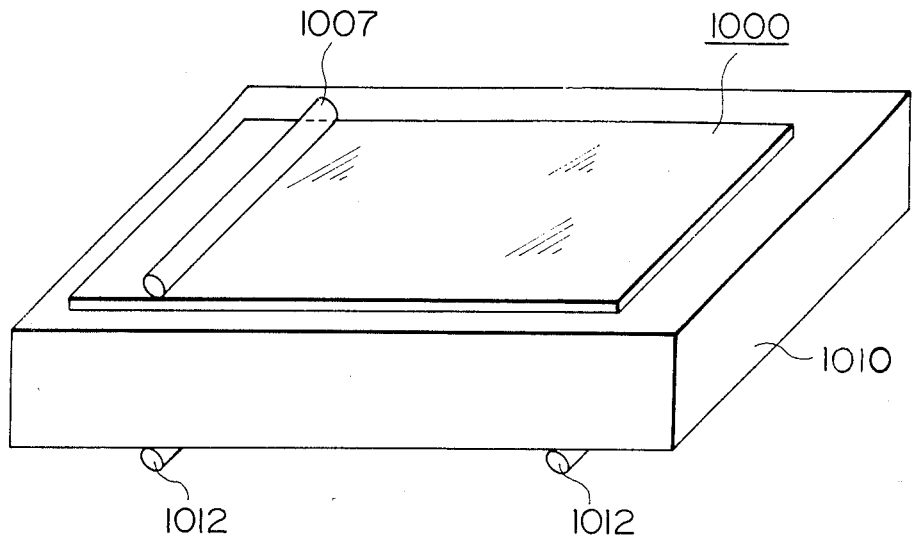
FIG. 27A is a perspective view schematically illustrating a device to be used in an embodiment of the method of the present invention and FIG. 27B is a sectional view thereof.
Figure 27B:
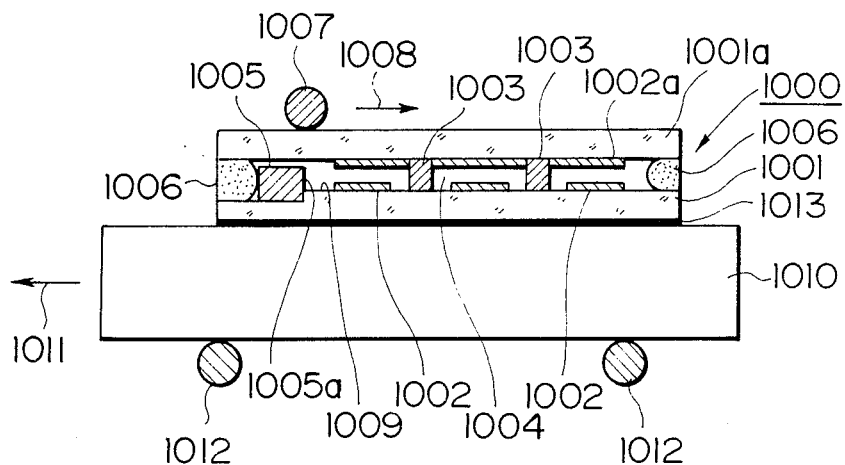

FIG. 27A shows a perspective view illustrating an example of a liquid crystal device for practicing the above mentioned embodiment of the present invention and FIG. 27B is a corresponding sectional view.

A cell 1000 shown in FIG. 27A and 27B comprises a pair of base plates 1001 and 1001a made of glass or plastic plates and held by a spacer 1003 to leave a predetermined gap. These base plates are bonded to each other with an adhesive 1006 to give a cell structure. On base plate 1001 are disposed a plurality of transparent electrodes 1002 forming a group of electrodes (for example a scanning voltage-applying electrode group of a matrix electrode arrangement) which are formed in a predetermined pattern such as a stripe pattern. On base plate 1001a are formed a plurality of transparent electrodes 1002a intersecting with the above mentioned transparent electrodes 1002 and forming another group of electrodes (for example, a signal voltage applying electrode group of a matrix electrode arrangement).

Base plates 1001 and 1001a are similar to base plates 101 and 101a explained by referring to FIG. 3A. Likewise, a similar insulating film may be formed on base plates 1001 and 1001a.

Hereinbelow, a method of controlling the orientation of liquid crystal layer 1004 is more specifically explained with reference to FIGS. 27A and 27B and an example wherein a liquid crystal material DOBAMBC showing ferroelectricity at specific temperatures is used.

A liquid crystal cell 400 hermetically containing DOBAMBC is set in a heating case (not shown) so that the entire cell can be heated. Then, the temperature of the heating case is controlled so that the average temperature of the cell will be, e.g., 70° C. to 90° C., whereby a liquid crystal layer 1004 in SmA or SmC* phase is formed. At this stage, liquid crystal layer 1004 is in a state prior to the application of the orientation controlling method described hereinbelow, and a monodomain of SmA or SmC* has not been formed.

In this state, a heating member 1007 as a heating means is moved in the direction of arrow 1008. Then, a region of liquid crystal layer 1004 heated by heating member 1007 to a temperature above a phase transition temperature (about 118° C.) of from SmA to isotropic is caused to assume an isotropic phase and immediately thereafter subjected to temperature decrease because heating member 1007 is continually moved in the direction of arrow 1008, whereby the liquid crystal in the region is caused to form a monodomain where SmA phase liquid crystal molecules are aligned or oriented in one direction at a point in time when the region is decreased to or below the phase transition temperature (about 116° C.) of from isotropic to SmA.

In a preferred embodiment of the invention, liquid crystal cell 1000 is provided with a member 1005 for promoting generation of a liquid crystal nucleus (i.e., nucleus generating member). When such a nucleus generating member is used, after the temperature of a portion of the liquid crystal in the vicinity of side wall 1005a of nucleus generating member reaches at or above the phase transition temperature of SmA→isotropic the portion of the liquid crystal is subjected to temperature decrease due to further movement of heating member 1007 in the arrow direction and positively caused to form monoaxially aligned liquid crystal molecules at a temperature below the phase transition temperature of isotropic→SmA due to horizontal or homogeneous orientation effect of side wall 1005a and face 1009 of base plate 1001. On further movement of heating member 1007, liquid crystal molecules of continuously formed SmA phase through isotropic→SmA transformation are applied with such a regulating force that they are aligned in parallel with the already aligned liquid crystal molecules in the vicinity of side wall 1005 of nucleus generating member 1005, whereby a monodomain is formed wherein the entire liquid crystal molecules are aligned in parallel with the longitudinal direction of side wall 1005.

Furthermore, as spacer members 1003 can have a function similar to that of nucleus generating member 1005 as will be described hereinafter, the presence of spacer members 1003 in liquid crystal cell 1000 does not obstruct the formation of a monodomain of SmA, SmC* or SmH* phase during the movement of heating member 1007 on liquid crystal cell 1000. In an especially preferred embodiment, spacer members 1003 are formed of the same material as that of nucleus generating member 1005. Thus, spacer members 1003 and nucleus generating member 1005 can be formed simultaneously by forming a film of specific resin or inorganic substance and selectively etching the film. Instead of using the etching method, a stripe film, glass fiber or highly oriented fiber usable as nucleus generating member 1005 may be disposed between base plates 1001 and 1001a.

Nucleus generating member 1005 may be formed of a cut film strip of polyester or polyimide to the side wall 1005 of which a rubbing effect has been imparted by cutting it with a metal blade or diamond blade. Alternatively, nucleus generating member 1005 may be formed of a highly oriented fiber as described hereinbefore obtained by spinning a polymer liquid crystal such as an anisotropic polymer solution (rheotropic liquid crystal) or an anisotropic molten polymer (thermotropic liquid crystal) into fiber. When such a highly oriented fiber is used as a spacer member 1004, a liquid crystal contacting the oriented surface of the fiber can be aligned or oriented along the orientation direction of the fiber.

When a flat plate lacking a recessed step as shown in the figure such as a flat glass plate is used as a base plate 1001, a film of SiO, $SiO_2$, $TiO_2$, etc. may be formed on the base plate and be subjected to etching with an ion beam irradiated in an oblique direction to form a nucleus generating member of a stripe film having a side wall 1005a. Alternatively, a nucleus generating member 1005 may be formed as follows. First, on base plate 1001 is formed an insulating film (not shown) of a generating hard material such as silicon nitride, silicon nitride containing hydrogen, silicon carbide, silicon carbide containing hydrogen, boron nitride, boron nitride containing hydrogen, cerium oxide, silicon oxide, aluminum oxide, zirconia or magnesium fluoride, and thereon is formed a film of a material with a lower hardness than the insulating film such as polyvinyl alcohol, polyimide, polyamide imide, polyester imide, polyparaxylylene, polyester, polycarbonate, polyvinyl acetal, polyvinyl chloride, polyamide, polystyrene, cellulose resin, melamine resin, urea resin, acrylic resin, or a functional resin such as photosensitive polyimide, photosensitive polyamide, cyclic rubber-type photoresist, phenol novolak-type photoresist or electron beam photoresist such as polymethyl methacrylate and epoxidized 1,4-polybutadiene. The film with a lower hardness is etched by using an ordinary photolithographic technique to from a nucleus generating member 1005, a sidewall 1005a of which is then rubbed to be provided with an orientation effect. It is possible that the top face of the nucleus generating member contacts base plate 1001a.

In liquid crystal cell 1000 of this example, a sheet-form heat-generating member 1013 is provided on the back side of base plate 1001. This sheet-form heating member 1013 is used to heat the entirety of liquid crystal cell 1000 and may be used for example to maintain the liquid crystal layer in SmA, SmC* or SmH* phase or can be used for uniformly heating liquid crystal layer 1004 instead of the above mentioned case. Heating member 1007 heats cell structure 1000 to such an extent that a liquid crystal in a phase of SmA, SmC* or SmH* is transformed to a higher temperature phase of isotropic, nematic or cholesteric during heating stage and is moved with such a velocity that the liquid crystal is sufficiently transformed into SmA or SmC* phase because of the movement thereof in the direction of arrow 1008. The velocity cannot be determined in general but may suitably be a value of the order on 1 mm/h to 5 mm/h.

This embodiment of the orientation controlling method of the present invention may also be practiced by fixing heating member 1007 and moving a liquid crystal cell 1000 along with a supporting table 1010 by means of rollers 1012 in the direction of arrow 1011, whereby heating member 1007 is moved relative to liquid crystal cell 1000.

Heating member 1007 used in this method may be formed of a resistance heat generating member such as a nickel-chromium alloy, ITO, tin oxide and indium oxide in various forms including wire, roll, bar, plate and stripe. In a case where the heating member is in the form of a wire, roll or bar, the diameter thereof is preferably on the order of 0.1 to 5 mm, particularly 0.5 to 2 mm. The heating member in the form of a plate or strip may suitably have a width of 0.1 to 5 mm, preferably 0.5 to 2 mm.

A preferred example of strip form heating member 1007 is shown in FIG. 28. A heating device 1101 shown in FIG. 28 comprises a strip form heating member 1007 of a nickel-chromium alloy formed by vapor deposition on the top face of a wedge-shaped supporting member 1102.

Further, a condenser-type infrared heater 1201 may also be used as a heating means. Infrared heater 1201 comprises a hood provided with a slit opening 1204 and a condenser mirror 1203 and an infrared lamp 1202 disposed in the hood.

With the heating means shown in FIGS. 28 and 29, they may be moved in the direction of arrows 1008 or alternatively liquid crystal cells 1000 may be moved in the direction of arrows 1011. Thus it is sufficient that liquid crystal cell 1000 is moved relative to the heating means.

When such a liquid crystal cell 1000 is sandwiched between a pair of polarizers which are disposed on both sides of base plates 1001 and 1001a in a cross nicol or parallel nicol arrangement, and voltages are applied between electrodes 1002 and 1002a, an optical modulation function is attained.

An actual example of the practice of this mode of the invention will explained hereinbelow.

At an end portion of a glass base plate provided with electrode stripes of ITO disposed with a width of 6.25 $\mu$m and a pitch of 100 $\mu$m, a cut-away portion or recessed step of 2.5 $\mu$m-depth is formed in parallel with the electrode stripes.

Then, a polyimide-forming solution ("PIQ" manufactured by Hitachi Kasei Kogyo K. K., non-volatile matter content of 14.5 wt. %) was coated in 10 sec. on the base plate except for the recessed step with a spinner coater rotating at 3000 r.p.m. and thereafter heated at a temperature of 120° C. for 30 min. to form a coating having a thickness of 2$\mu$.

Then, a positive-type resist solution ("AZ 1350" manufactured by Shipley Company, Ltd.) was spinner-coated onto the resultant coating and prebaked. The resist layer was exposed to light through a stripeshaped mask having a masking width of 8$\mu$ and an interval thereof of 100$\mu$. Then, by developing the resist with a developer "MF132" containing tetramethyl ammonium hydroxide, the resist film of the exposed portion and the polyimide film located therebelow were etched to form through holes. After the base plate thus treated was washed and dried, the resist film of non-exposed portions was removed with methyl ethyl ketone. Thereafter, the polyimide film was cured by heating at 200° C. for 60 min. and at 350° C. for 30 min. to form an electrode plate A having a spacer layer of PIQ (polyimide isoindoloquinazolinedione). At the recessed step of the electrode plate (A), a strip of polyethylene terephthalate film (Mylar film, a product of E. I. Du Pont de Nemours Co., United States of America) cut by a metal blade was disposed as a nucleus generating member.

Then, an electrode plate (B) was prepared by forming stripe-pattern electrodes with a width of 62.5 $\mu$m and a pitch of 100 $\mu$m. Onto the peripheral portion except for a part forming an injection port of the electrode plate (B), an epoxy adhesive was applied by the screen printing process. The above electrode plates (A) and (B) were arranged so that their stripe pattern electrodes overlapped perpendicularly to each other and the adhesive was cured under the prescribed conditions to form a cell structure.

Thereafter, DOBAMBC in its isotropic phase was injected through the injection port into the cell by the vacuum injection method, and the injection port was sealed.

On both sides of the cell thus formed, a pair of polarizers were disposed in a cross nicol relationship and set in a heating case controlled to a temperature of 90° C. When the liquid crystal layer of the structure thus obtained was observed through a microscope, it was confirmed that SmC* phase was formed but it did not form a monodomain.

A wire heater of nickel-chromium alloy in a diameter of 0.2 mm was disposed on the above liquid crystal cell maintained at 90° C. and in the neighborhood of and in parallel with the nucleus generating member as shown in FIGS. 27A and 27B. The wire heater was caused to generate heat by passing a current thereto. At this time, the temperature of the portion of the liquid crystal cell heated by the wire heater was confirmed to be 120° to 140° C., and then the wire heater was moved at a rate of 2 mm/h in the direction of arrow 1008 shown in FIG. 27B.

The thus prepared liquid crystal cell was sandwiched between a pair of polarizers disposed in a cross nical relationship and the liquid crystal layer thereof was observed through a microscope, it was confirmed that a monodomain of SmC* phase had been formed.

In the above-described manner, the orientation can be completed. However, even when a monodomain appears to be formed uniformly at a glance, non-uniformity in optical contrast or response speed can occasionally occur depending on regions when the cell is examined with respect to switching characteristics as a liquid crystal optical modulation device by actually applying voltages between electrodes 1002 and 1002a. This phenomenon may be attributable to a structural strain due to the temperature gradient provided at the time of orientation treatment. In order to cope with the difficulty, it is effective to raise the temperature of the case once after the orientation process thereby to transform the liquid crystal once from the SmC* phase to SmA phase and then decrease the temperature of the case to re-form the SmC* phase, whereby the above mentioned strain can be removed due to structural relaxation.

FIGS. 10 to 12 show an example of a driving method for the optical modulation device according to the present invention.

Figure 11A:
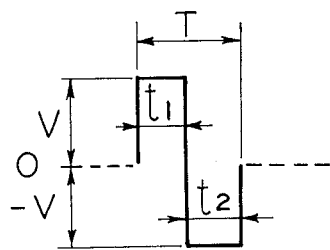
FIGS. 11A to 11D respectively show waveforms of voltage signals for driving an optical modulation device of the present invention.
Figure 11C:
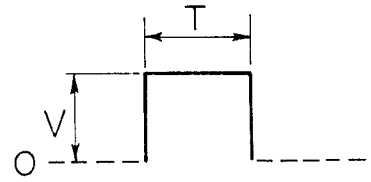
Figure 11B:
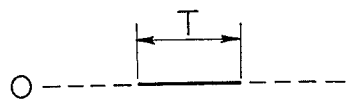
Figure 11D:
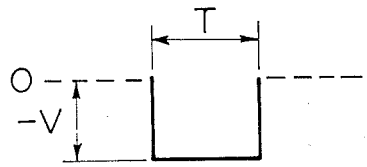
Figure 12A:
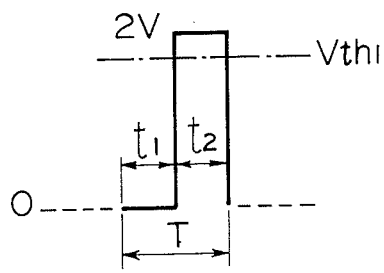
FIGS. 12A to 12D respectively show voltage waveforms applied to respective picture elements.
Figure 12C:
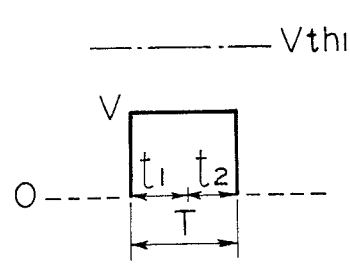
Figure 12B:
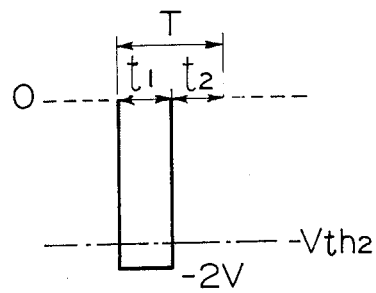
Figure 12D:
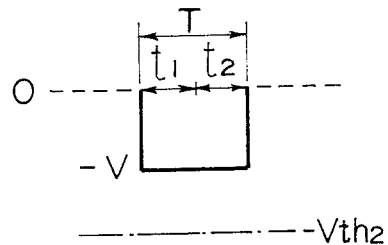

FIG. 10 is a view schematically showing a cell 41 having matrix electrode arrangement between which a ferroelectric liquid crystal compound is interposed. Reference numerals 42 and 43 denote a group of scanning electrodes and a group of signal electrodes, respectively. FIGS. 11A and 11B show electric signals applied to a selected scanning electrode 42(s) and other scanning electrodes (non-selected scanning electrodes) 42(n), respectively. FIGS. 11C and 11D show electric signals applied to selected signal electrodes 43(s) and nonselected signal electrodes 43(n), respectively. In FIGS. 11A to 11D, the abscissa and the ordinate represent a time and a voltage, respectively. For instance, when a motion picture is displayed, a scanning electrode is sequentially and periodically selected from the group of scanning electrodes 42. Here, the threshold voltage for a first stable state of a liquid crystal having bistability is represented by $V_{th1}$, and a threshold voltage for a second stable state thereof by $-V_{th2}$. The electric signal applied to the selected scanning electrode 42(s) is an alternating voltage of V and $-V$ at phases (times) of $t_1$ and $t_2$, respectively, as shown in FIG. 11A. The other scanning electrodes 42(n) are grounded, thus resulting in zero voltage of the electric signal. On the other hand, electric signals applied to the selected signal electrodes 43(s) have voltages of V as shown in FIG. 11C, while those applied to the non-selected signal electrodes have voltages of $-V$, as shown in FIG. 11D. The voltages of V and $-V$ are set to desired values satisfying the following relationships, $$V < V_{th1} < 2V, \text{ and}$$

$$-V > V_{th2} > -2V.$$

Voltage waveforms applied to respective picture elements when such electric signals are provided are shown in FIGS. 12. Voltage waveforms shown in FIGS. 12A to 12D correspond to those applied to picture elements A, B, C and D shown in FIG. 10, respectively. Thus, as seen from FIG. 12, a voltage of 2 V above the threshold voltage $V_{th1}$ is applied to the picture elements A on the selected scanning line at a phase of $t_2$. In contrast, a voltage of $-2$ V below the threshold voltage $-V_{th2}$ is applied to the picture elements B at a phase of $t_1$. Accordingly, the orientation of liquid crystal molecules is determined depending upon whether a signal electrode is selected on the selected scanning electrode line, or not. Namely, when a signal electrode is selected, the liquid crystal molecules are oriented to the first stable state. To the contrary, when not selected, they are oriented to the second stable state. In either case, the orientation is not related to the previous state of each picture element.

On the other hand, voltages applied to all picture elements C and D on the non-selected scanning lines are V and $-V$, respectively, either of which is not above the threshold voltage in terms of the absolute value. Accordingly, the liquid crystal molecules corresponding to picture elements C and D maintain the orientation corresponding to the signal state when last scanned without changing the oriented state. Namely, when a certain scanning electrode is selected, signals assigned to the one line of the selected scanning line are written. During a time interval from a time at which the scanning of one frame is completed to a time at which a subsequent line is selected, the concerned signal state can be maintained. Accordingly, even if the number of scanning electrodes increases, the duty ratio does not substantially change, resulting in no possibility of lowering in contrast and occurrence of crosstalk, etc. In this instance, the value of the voltage V and time width of the phase of $(t_1 + t_2) = T$ are usually set to ranges of 3 volts to 70 volts and of 0.1 $\mu$sec. to 2 msec., respectively, although they depend upon the thickness of a liquid crystal material or a cell used. Accordingly, in this case, electric signals applied to a selected scanning electrode cause the transition from the first stable state (referring to "bright" state when they are converted into optical signals) to the second stable state (referring to "dark" state when converted into optical signals), or vice versa.

What is claimed is:

1. A device for controlling orientation of a liquid crystal comprising:

a cell structure comprising a pair of base plates and a nucleus-generating member disposed therebetween, and a stripe-shaped film resistance heat-generating member disposed at a predetermined distance from the nucleus-generating member; said heat-generating member having a larger heat generating capacity near its ends then its central portion.

2. The orientation controlling device according to claim 1, wherein said nucleus generating member has a stripe shape.

3. The orientation controlling device according to claim 2, wherein a plurality of said nucleus generating members are arranged in stripes.

4. The orientation controlling device according to claim 1, wherein said nucleus generating member is formed of a resin or an inorganic material.

5. The orientation controlling device according to claim 4, wherein said resin is at least one member selected from the group consisting of polyvinyl alcohol, polyimide polyamide imide, polyester imide, polyparaxylylene, polyester, polycarbonate, polyvinyl acetal, polyvinyl chloride, polyvinyl acetate, polyamide, polystyrene, cellulose resin, melamine resin, urea resin, acrylic resin and photoresist resins.

6. The orientation controlling device according to claim 1, wherein said-stripe shaped film resistane heat generating member has a larger width at central portion than those at the end portions.

7. The orientation controlling device according to claim 1, wherein electroconductive films constituting electrodes are formed on the mutually opposed faces of said pair of base plates.

8. A device for controlling orientation of a liquid crystal comprising:
a cell structure comprising a pair of base plates and a nucleus-generating member disposed therebetween, and
a planar, wedge-shaped film resistance heat-generating member.

9. The orientation controlling device according to claim 8, wherein said nucleus generating member has a stripe shape.

10. The orientation controlling device according to claim 8, wherein a plurality of said nucleus generating members are arranged in stripes.

11. The orientation controlling device according to claim 8, wherein said nucleus generating member is formed of a resin or an inorganic material.

12. The orientation controlling device according to claim 11, wherein said resin is at least one member selected from the group consisting of polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, cellulose resin, melamine resin, urea resin, acrylic resin and photoresist resins.

13. The orientation controlling device according to claim 8, wherein electroconductive films constituting electrodes are formed on the mutually opposed faces of said pair of base plates.

14. A device for controlling orientation of a liquid crystal comprising:
a cell structure comprising a pair of base plates and a monoaxial orientation controlling member disposed therebetween, and
a stripe-shaped film resistance heat-generating member disposed at a predetermined distance from the orientation controlling member; said heat-generating member having a larger heat-generating capacity near its ends than its central portion.

15. The orientation controlling device according to claim 14, wherein said monoaxial orientation controlling member has a stripe shape.

16. The orientation controlling device according to claim 15, wherein a plurality of said monoaxial orientation controlling members are arranged in stripes.

17. The orientation controlling device according to claim 14, wherein said nucleus generating member is formed of a resin or an inorganic material.

18. The orientation controlling device according to claim 17, wherein said resin is at least one member selected from the group consisting of polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, cellulose resin, melamine resin, urea resin, acrylic resin and photoresist resins.

19. The orientation controlling device according to claim 14, wherein electroconductive films constituting electrodes are formed on the mutually opposed faces of said pair of base plates.

20. A device for controlling orientation of a liquid crystal comprising:
a cell structure comprising a pair of base plates and a monoaxial orientation controlling member disposed therebetween, and
a planar, wedge-shaped film resistance heat-generating member.

21. The orientation controlling device according to claim 20, wherein said planer heat generating member generates heat increasing in amount in a direction perpendicular to and leaving from said monoaxial orientation controlling member.

22. The orientation controlling device according to claim 20, wherein said monoaxial orientation controlling member has a stripe shape.

23. The orientation controlling device according to claim 20, wherein a plurality of said monoaxial orientation controlling members are arranged in stripes.

24. The orientation controlling device according to claim 20, wherein said monoaxial orientation controlling member is formed of a resin or an inorganic material.

25. The orientation controlling device according to claim 24, wherein said resin is at least one member selected from the group consisting of polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, cellulose resin, melamine resin, urea resin, acrylic resin and photoresist resins.

26. The orientation controlling device according to claim 20, wherein electroconductive films constituting electrodes are formed on the mutually opposed faces of said pair of base plates.

27. A device for controlling orientation of a liquid crystal comprising:
providing a cylindrical member between a pair of base plates and contiguous with a liquid crystal interposed between the pair of base plates,
forming a monoaxially anistropic phase of the liquid crystal wherein liquid crystal molecules are first aligned in one direction in the vicinity of a boundary with said cylindrical member to leave a different phase of the liquid crystal which is a higher temperature phase than said monoaxially anistropic phase with a phase boundary therebetween.
transforming a part of said different phase adjacent to the phase boundary under temperature decrease into the monoaxially anistropic phase where liquid crystal molecules are aligned in parallel with the alignment direction of the liquid crystal molecules in the said monoaxially anistropic phase, and
successively causing the phase transformation from the phase boundary in a direction perpendicular to the phase boundary, thereby to form a monodomain of the liquid crystal wherein the liquid crystal molecules are aligned in one direction.

28. The orientation controlling method according to claim 27, wherein said phase boundary extends linearly.

29. The orientation controlling method according to claim 27, wherein said different phase has a temperature gradient increasing in a direction perpendicular to and leaving from a nucleus generating member and is transformed into the monoaxially anisotropic phase by being cooled with such a temperature gradient.

30. The orientation controlling method according to claim 27, wherein said monoaxially anisotropic phase is smectic A phase.

31. The orientation controlling method according to claim 30, wherein said smectic A phase is cooled to be transformed into a chiral smectic phase.

32. The orientation controlling method according to claim 31, wherein said chiral smectic phase is chiral smectic C, H, F, I, G, K or J phase.

33. The orientation controlling method according to claim 31, wherein said chiral smectic phase has a non-spiral structure.

34. The orientation controlling method according to claim 27, wherein said different phase which is a higher temperature phase than said monoaxially anisotropic is a nematic phase, cholesteric phase or isotropic phase.

35. The orientation controlling method according to claim 27, wherein said cylindrical member is formed of glass fiber.

36. The orientation controlling method according to claim 27, wherein a plurality of said cylindrical members are arranged.

37. The orientation controlling device according to claim 27, wherein said cylindrical member formed of glass fiber.

38. The orientation controlling device according to claim 27, wherein a plurality of said cylindrical members are disposed.

39. The orientation controlling device according to claim 27, wherein said heat generating member is a resistance heat generating member.

40. The orientation controlling device according to claim 27, wherein said heat generating member is a film resistance heat generating member.

41. A device for controlling orientation of a liquid crystal comprising:
a cell structure comprising a pair of base plates and a cylindrical member disposed therebetween, and
a stripe-shaped heat-generating member disposed at a predetermined distance from the cylindrical member; said heat-generating member having a larger heat generating capacity near its ends than its central portion.

42. The orientation controlling device according to claim 41, wherein said-stripe shaped film resistane heat generating member has a larger width at the central portion than those at the end portions.

43. The orientation controlling device according to claim 41, wherein electroconductive films constituting electrodes are formed on the mutually opposed faces of said pair of base plates.

44. A device for controlling orientation of a liquid crystal comprising:
a cell structure comprising a pair of base plates and a cylindrical member disposed therebetween, and
a planar wedge-shaped heat-generating member.

45. The orientation controlling device according to claim 44, wherein said cylindrical member is formed of glass fiber.

46. The orientation controlling device according to claim 44, wherein a plurality of said cylindrical members are disposed.

47. The orientation controlling device according to claim 44, wherein said planar heat generating member is a resistance heat generating member.

48. The orientation controlling device according to claim 44, wherein said planar heat generating member is a film resistance heat generating member.

49. The orientation controlling device according to claim 44, wherein electroconductive films constituting electrodes are formed on the mutually opposed faces of said pair of base plates.

50. A device for controlling orientation of a liquid crystal comprising:
a cell structure comprising a pair of base plates and a nucleus-generating member disposed therebetween, and
a film resistance heat-generating member disposed in a stripe along the periphery of at least one of the base plates.

51. The orientation controlling device according to claim 50, wherein said nucleus generating member has a stripe shape.

52. The orientation controlling device according to claim 51, wherein a plurality of said nucleus generating members are arranged in stripes.

53. The orientation controlling device according to claim 50, wherein said nucleus generating member is formed of a resin or an inorganic material.

54. The orientation controlling device according to claim 53, wherein said resin is at least one member selected from the group consisting of polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, cellulose resin, melamine resin, urea resin, acrylic resin and photoresist resins.

55. The controlling device according to claim 50, wherein electroconductive films constituting electrodes are formed on the mutually opposed faces of said pair of base plates.

56. A device for controlling orientation of a liquid crystal comprising:
a cell structure comprising a pair of base plates and a monoaxial orientation controlling member disposed therebetween, and
a stripe-shaped film resistance heat-generating member disposed at a predetermined distance from the orientation controlling member; said heat-generating member having a larger width at its central portion than at its ends.

57. The orientation controlling device according to claim 56, wherein said monoaxial orientation controlling member has a stripe shape.

58. The orientation controlling device according to claim 57, wherein a plurality of said monoaxial orientation controlling members are arranged in stripes.

59. The orientation controlling device according to claim 56, wherein said nucleus generating member is formed of a resin or an inorganic material.

60. The orientation controlling device according to claim 59, wherein said resin is at least one member selected from the group consisting of polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, cellulose resin, melamine resin, urea resin, acrylic resin and photoresist resins.

61. The orientation controlling device according to claim 56, wherein electroconductive films constituting electrodes are formed on the mutually opposed faces of said pair of base plates.

62. A device for controlling orientation of a liquid crystal comprising:
   a cell structure comprising a pair of base plates and a monoaxial orientation controlling member disposed therebetween, and
   a stripe-shaped film resistance heat-generating member disposed in a stripe along the periphery of at lest one of said base plates.

63. The orientation controlling device according to claim 62, wherein said monoaxial orientation controlling member has a stripe shape.

64. The orientation controlling device according to claim 63, wherein a plurality of said monoaxial orientation controlling members are arranged in stripes.

65. The orientation controlling device according to claim 62, wherein said nucleus generating member is formed of a resin or an inorganic material.

66. The orientation controlling device according to claim 65, wherein said resin is at least one member selected from the group consisting of polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, cellulose resin, melamine resin, urea resin, acrylic resin and photoresist resins.

67. The orientation controlling device according to claim 62, wherein electroconductive films constituting electrodes are formed on the mutually opposed faces of said pair of base plates.

68. A device for controlling orientation of a liquid crystal comprising:
   a cell structure comprising a pair of base plates and a cylindrical member disposed therebetween, and
   a heat-generating member disposed in a stripe along the periphery of at least one of said base plates.

69. The orientation controlling device according to claim 68, wherein said cylindrical member is formed of glass fiber.

70. The orientation controlling device according to claim 69, wherein a plurality of said cylindrical members are disposed.

71. The orientation controlling device according to claim 68, wherein said heat-generating member is a resistance heat generating member.

72. The orientation controlling device according to claim 68, wherein said heat-generating member is a film resistance heat generating member.

73. The orientation controlling device according to claim 68, wherein electroconductive films constituting electrodes are formed on the mutually opposed faces of said pair of base plates.

74. A method of controlling orientation of a liquid crystal comprising:
   providing a cell structure having first and second ends and comprising a pair of base plates and a liquid crystal capable of forming a monoaxially anisotropic phase at specific temperatures and a higher temperature phase at temperatures higher than said specific temperatures, and movable heating means capable of moving relative to the cell structure, and
   causing said movable heating member to move relative to the cell structure from the first end to the second end, whereby said liquid crystal is caused to form said higher temperature phase at portions heated by the movable heating members and then to form said monoaxial anisotropic phase during the subsequent temperature decreasing stage.

75. The orientation controlling method according to claim 74, wherein said cell structure is provided with a nucleus generating member and said monoaxially anisotropic phase is initially formed along the boundary between said liquid crystal and the nucleus generating member.

76. The orientation controlling method according to claim 75, wherein said nucleus generating member has a stripe shape.

77. The orientation controlling method according to claim 76, wherein said nucleus generating member is formed of a resin or an inorganic material.

78. The orientation controlling method according to claim 77, wherein said resin is at least one member selected from the group consisting of polyvinyl alcohol, polyimide, polyamide imide, polyester imide, polyparaxylylene, polyester, polycarbonate, polyvinyl acetal, polyvinyl chloride, polyvinyl acetate, polyamide polystyrene, cellulose resin, melamine resin, urea resin, acrylic resin and photoresist resins.

79. The orientation controlling method according to claim 74, wherein said cell structure is provided with a plurality of spacer members.

80. The orientation controlling method according to claim 79, wherein said spacer member have stripe shapes.

81. The orientation controlling method according to claim 74, wherein said monoaxially anisotropic phase is a smectic phase.

82. The orientation controlling method according to claim 81, wherein said smectic phase is smectic A phase.

83. The orientation controlling method according to claim 82, wherein said smectic A phase is cooled to be transformed into a chiral smectic phase.

84. The orientation controlling method according to claim 83, wherein said chiral smectic phase has a non-spiral structure.

85. The orientation controlling method according to claim 74, wherein said different phase which is a higher temperature phase than said monoaxially anisotropic is a nematic phase, cholesteric phase or isotropic phase.

86. The orientation controlling method according to claim 83, wherein said chiral smectic phase is chiral smectic C, H, F, I, G, K or J phase.

87. A liquid crystal device obtained through a method of controlling orientation of a liquid crystal, which method comprises:
   providing a cell structure having first and second ends and comprising a pair of base plates and a liquid crystal capable of forming a monoaxially anisotropic phase at specific temperatures and a higher temperature phase at temperatures higher than said specific temperatures, and movable heating means capable of moving relative to the cell structure, and
   causing said movable heating member to move relative to the cell structure from the first end to the second end, whereby said liquid crystal is caused to form said higher temperature phase at portions heated by the movable heating members and then to form said monoaxial anisotropic phase during the subsequent temperature decreasing stage.

* * * * *

UNITED STATES PATENT AND TRADEMARK OFFICE
CERTIFICATE OF CORRECTION

PATENT NO. : 4,781,441
DATED : November 1, 1988
INVENTOR(S) : JUNICHIRO KANBE, ET AL.      Page 1 of 3

It is certified that error appears in the above-identified patent and that said Letters Patent is hereby corrected as shown below: Title page:

AT [56] REFERENCES CITED

Foreign Patent Documents, "60115915" should read --60-115915--.

COLUMN 30

Line 57, "then" should read --than--.

COLUMN 31

Line 2, "polyimide polyamide" should read --polyimide, polyamide--.
Line 8, "said-stripe shaped" should read --said stripe-shaped--.
Line 8, "resistane" should read --resistance--.
Line 61, "nucleus generating member" should read --monoaxial orientation controlling member--.

COLUMN 32

Line 52, "therebetween." should read --therebetween,--.

UNITED STATES PATENT AND TRADEMARK OFFICE
CERTIFICATE OF CORRECTION

PATENT NO. : 4,781,441

DATED : November 1, 1988

INVENTOR(S) : JUNICHIRO KANBE, ET AL.

It is certified that error appears in the above-identified patent and that said Letters Patent is hereby corrected as shown below:

COLUMN 33

Line 18, "anisotropic" should read --anisotropic phase--
    Line 27, "claim 27," should read --claim 41,--.
    Line 27, "member formed" should read --member is formed--.
    Line 30, "claim 27," should read --claim 41,--.
    Line 33, "claim 27," should read --claim 41,--.
    Line 36, "claim 27," should read --claim 41,--.
    Line 48, "said-stripe shaped" should read --said stripe-shaped--.
    Line 48, "resistane" should read --resistance--.

COLUMN 34

Line 33, "controlling" should read --orientation controlling--.

COLUMN 35

Line 8, "lest" should read --least--.

UNITED STATES PATENT AND TRADEMARK OFFICE
CERTIFICATE OF CORRECTION

PATENT NO. : 4,781,441

DATED : November 1, 1988

INVENTOR(S) : JUNICHIRO KANBE, ET AL.    Page 3 of 3

It is certified that error appears in the above-identified patent and that said Letters Patent is hereby corrected as shown below:

COLUMN 36

Line 42, "anisotropic" should read --anisotropic phase--.

Signed and Sealed this

Seventeenth Day of October, 1989

Attest:

DONALD J. QUIGG

Attesting Officer    Commissioner of Patents and Trademarks